(12) United States Patent
Ouziel et al.

(10) Patent No.: US 12,021,980 B2
(45) Date of Patent: *Jun. 25, 2024

(54) RESTRICTING USAGE OF ENCRYPTION KEYS BY UNTRUSTED SOFTWARE

(71) Applicant: Intel Corporation, Santa Clara, CA (US)

(72) Inventors: Ido Ouziel, Ein Carmel (IL); Arie Aharon, Haifa (IL); Dror Caspi, Kiryat Yam (IL); Baruch Chaikin, D.N. Misagv (IL); Jacob Doweck, Haifa (IL); Gideon Gerzon, Zichron Yaakov (IL); Barry E. Huntley, Hillsboro, OR (US); Francis X. McKeen, Portland, OR (US); Gilbert Neiger, Portland, OR (US); Carlos V. Rozas, Portland, OR (US); Ravi L. Sahita, Portland, OR (US); Vedvyas Shanbhogue, Austin, TX (US); Assaf Zaltsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/465,311

(22) Filed: Sep. 2, 2021

(65) Prior Publication Data
US 2021/0399882 A1 Dec. 23, 2021

Related U.S. Application Data

(63) Continuation of application No. 16/228,002, filed on Dec. 20, 2018, now Pat. No. 11,139,967.

(51) Int. Cl.
H04L 9/08 (2006.01)
G06F 9/455 (2018.01)
(Continued)

(52) U.S. Cl.
CPC .......... *H04L 9/088* (2013.01); *G06F 9/45558* (2013.01); *G06F 12/1009* (2013.01);
(Continued)

(58) Field of Classification Search
CPC ....... H04L 9/088; H04L 9/08; G06F 9/45558; G06F 12/1009; G06F 21/602;
(Continued)

(56) References Cited

U.S. PATENT DOCUMENTS

2004/0255145 A1* 12/2004 Chow ................. G06F 12/1466
726/16
2012/0159184 A1* 6/2012 Johnson ................ G06F 21/645
713/189
(Continued)

FOREIGN PATENT DOCUMENTS

EP 1283458 A2 2/2003

OTHER PUBLICATIONS

European Search Report and Search Opinion, EP App. No. 19209897.8, dated May 25, 2020, 11 pages.
(Continued)

Primary Examiner — Robert B Leung
Assistant Examiner — Howard H. Louie
(74) Attorney, Agent, or Firm — NICHOLSON DE VOS WEBSTER & ELLIOTT LLP

(57) ABSTRACT

A processor includes a processor core. A register of the core is to store: a bit range for a number of address bits of physical memory addresses used for key identifiers (IDs), and a first key ID to identify a boundary between non-restricted key IDs and restricted key IDs of the key identifiers. A memory controller is to: determine, via access to bit range and the first key ID in the register, a key ID range of the restricted key IDs within the physical memory addresses; access a processor state that a first logical processor of the
(Continued)

processor core executes in an untrusted domain mode; receive a memory transaction, from the first logical processor, including an address associated with a second key ID; and generate a fault in response to a determination that the second key ID is within a key ID range of the restricted key IDs.

23 Claims, 14 Drawing Sheets

(51) Int. Cl.
*G06F 12/1009* (2016.01)
*G06F 21/60* (2013.01)
*G06F 21/62* (2013.01)
(52) U.S. Cl.
CPC ............ *G06F 21/602* (2013.01); *G06F 21/62* (2013.01); *G06F 2009/45583* (2013.01); *G06F 2009/45587* (2013.01); *G06F 2212/1044* (2013.01); *G06F 2212/657* (2013.01)

(58) Field of Classification Search
CPC ........... G06F 21/62; G06F 2009/45583; G06F 2009/45587; G06F 2212/1044; G06F 2212/657; G06F 9/455; G06F 21/60
See application file for complete search history.

(56) References Cited

U.S. PATENT DOCUMENTS

| 2014/0258736 A1* | 9/2014 | Merchan ............... H04L 9/0866 |
| | | 713/193 |
| 2018/0034792 A1* | 2/2018 | Gupta .................. G06F 21/602 |
| 2018/0046823 A1* | 2/2018 | Durham ................ H04L 9/3236 |
| 2018/0063100 A1 | 3/2018 | Peeters et al. |

OTHER PUBLICATIONS

Notice of Allowance, U.S. Appl. No. 16/228,002, dated Jun. 9, 2021, 9 pages.

* cited by examiner

US 12,021,980 B2

RESTRICTING USAGE OF ENCRYPTION KEYS BY UNTRUSTED SOFTWARE

TECHNICAL FIELD

The disclosure relates to protection of data stored in memory of a computer system, and more particularly, restricting usage of encryption keys by untrusted software.

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Various techniques, therefore, have been employed to protect sensitive data residing in at least some regions of memory. Doing so has become challenging, particularly in a cloud or server environment where multiple customer workloads (from different entities) may be supported simultaneously on the same server.

DETAILED DESCRIPTION

Figure 1A:
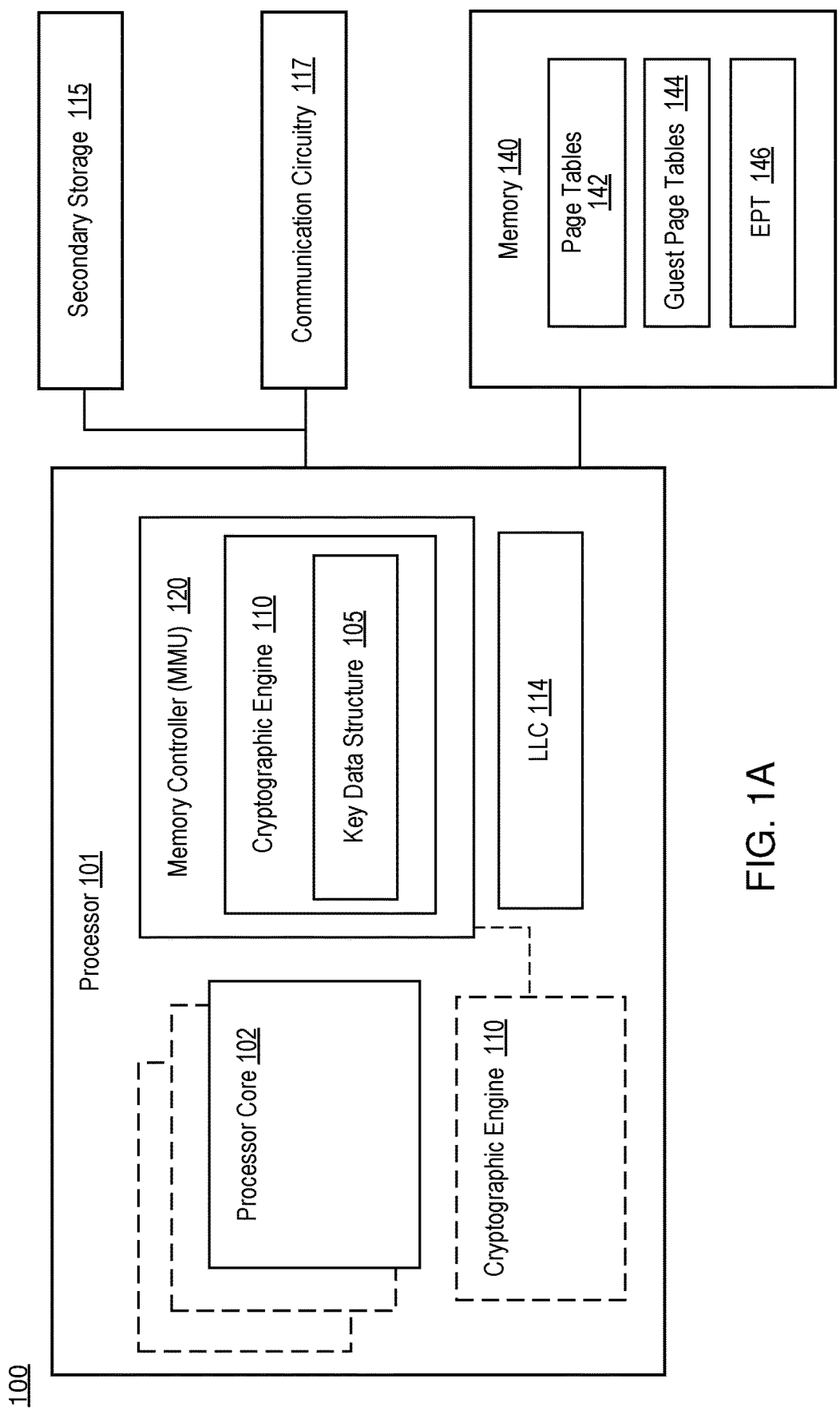
FIGS. 1A and 1B are a system block diagram of a computing device for restricting usage of encryption keys by untrusted software according to various implementations.

A current trend in computing is the placement of data and enterprise workloads in the cloud by utilizing hosting services provided by cloud server provider (CSPs). As a result of the hosting of the data and enterprise workloads in the cloud, customers (e.g., tenants) of the CSPs are requesting better security and isolation solutions for their workloads. In particular, customers seek solutions that enable the operation of CSP-provided software outside of a Trusted Computing Base (TCB) of the tenant's software. The TCB of a system refers to a set of hardware, firmware, and/or software components that have an ability to influence the trust for the overall operation of the system. Accordingly, for example, a virtual machine monitor (VMM or hypervisor) establishes and controls a virtual machine (VM), which executes the tenant software. Tenants therefore want the components of the VMM to operate outside of the tenant's TCB. If the VMM is executed as software on top of hardware of a virtualized server, the VMM is considered untrusted software.

In furtherance of data security in CSP-based systems, various techniques have been employed to protect sensitive data residing in regions of memory, e.g., of CSP servers. Some system processors provide cryptographic mechanisms for encryption, integrity, and replay protection. Memory encryption protects the confidentiality of memory-resident data. For example, total memory encryption (TME) may encrypt data that is moving from a processor core to memory and may decrypt the encrypted data on its way back to the processor core. Additionally, the CSP server may support the use of multiple encryption keys, e.g., a different key for each secure domain serviced by the server, which could be dozens or thousands of domains. Accordingly, a TME engine may be adapted to securely manage the use of multiple encryption keys as a multi-key TME (or MK-TME) engine.

Domains may refer to workloads, such as a client machine (e.g., virtual machine), an operating system, an application, or other types of workloads the server supports that may be associated with different tenants. For example, a secure domain may be a tenant workload, such as an operating system, along with other ring-3 applications executing on top of the operating system, or a VM executing on top of a VMM, which itself is a separate domain, along with other ring-3 applications. The benefit of supporting the use of multiple keys is to provide cryptographic isolation between different tenant domains, e.g., one secure domain cannot access encrypted data if that encrypted data belongs to a different secure domain being protected with a different encryption key. These benefits extend to the ability of a CSP to support a growing number of tenant workloads on the same server, or within the same server cluster, to adapt to growing demands for cloud-based resources.

In a memory system that interfaces with an MK-TME engine of a virtualization server, a memory manager such as the VMM may allocate different encryption keys to different secure domains. The problem is that the VMM has full access to all encryption keys and can therefore read the memory of any secure domain on the server. Accordingly, access to at least some of the encryption keys is to be restricted. Restricted keys are usable by the security domain they are allocated to and not by other, untrusted software such as the memory manager or VMM, even if the latter allocated those keys in the first place.

In various implementations, a processor of the server (or other computing device) may include a processor core having a hardware register such as a model-specific register (MSR). When the server boots up, basic input-output system (BIOS) firmware may store particular information in the hardware register for later use by the processor core in restricting access to the restricted encryption keys. This information may include a bit range for a number of address bits of physical memory addresses (e.g., host physical addresses) used for key identifiers (IDs). These key IDs may be associated with and identify domain-specific encryption keys. In one implementation, the address bits that identify the key IDs are upper address bits of the physical memory addresses. The particular information stored by BIOS into the hardware register may further include a first key identifier (ID), of the key IDs, to identify a boundary between non-restricted key IDs and restricted key IDs of the key identifiers. Furthermore, in one implementation, an additional key ID may be stored that forms a second boundary of the restricted key IDs.

In these implementations, the processor (or a memory controller of the processor) may further determine, via access to the hardware register, a key ID range of the restricted key IDs within the physical memory addresses. The processor may also access a processor state that includes that a first logical processor of the processor core executes in an untrusted domain mode, where a logical processor may be associated with a particular hardware thread being run on the processor core. In the present implementation, this hardware thread may be the execution of the VMM (or hypervisor). The processor may further receive a memory transaction, from the first logical processor, including an address associated with a second key ID. The processor may access the address and determine the second key ID in various ways, which will be described in more detail. The processor may then determine the second key ID is within the key ID range of the restricted key IDs, and generate a fault related to a type of access to the second key ID by the first logical processor. The processor core may also block access by the first logical processor to a memory location associated with the physical memory address from which the second key ID was retrieved.

In various implementations, the type of access may be via a direct-physical-mapped access of the physical memory address in the memory transaction, and thus may directly read the second key ID from the physical memory address. In other implementations, the access is to translate a linear address within the memory transaction to the physical memory address via paging, and thus gain access to the second key ID. In further implementations, the access is to translate a guest virtual address (GVA) to a guest physical address (GPA) (e.g., through a walk of guest page tables), and to translate the guest physical address to a host physical address (HPA), which is the physical memory address to which is appended the second key ID. For purposes of different responses and tracking of these different accesses, the processor core may trigger different faults as will be discussed in more detail.

These features and others herein described include many benefits, in particular, removing the VMM (or hypervisor) from the TCB of the secure domains that use different restricted encryption keys. This provides a way for tenant virtual machines (VM's) running under the VMM to retain confidentiality even from the VMM itself.

Figure 1B:
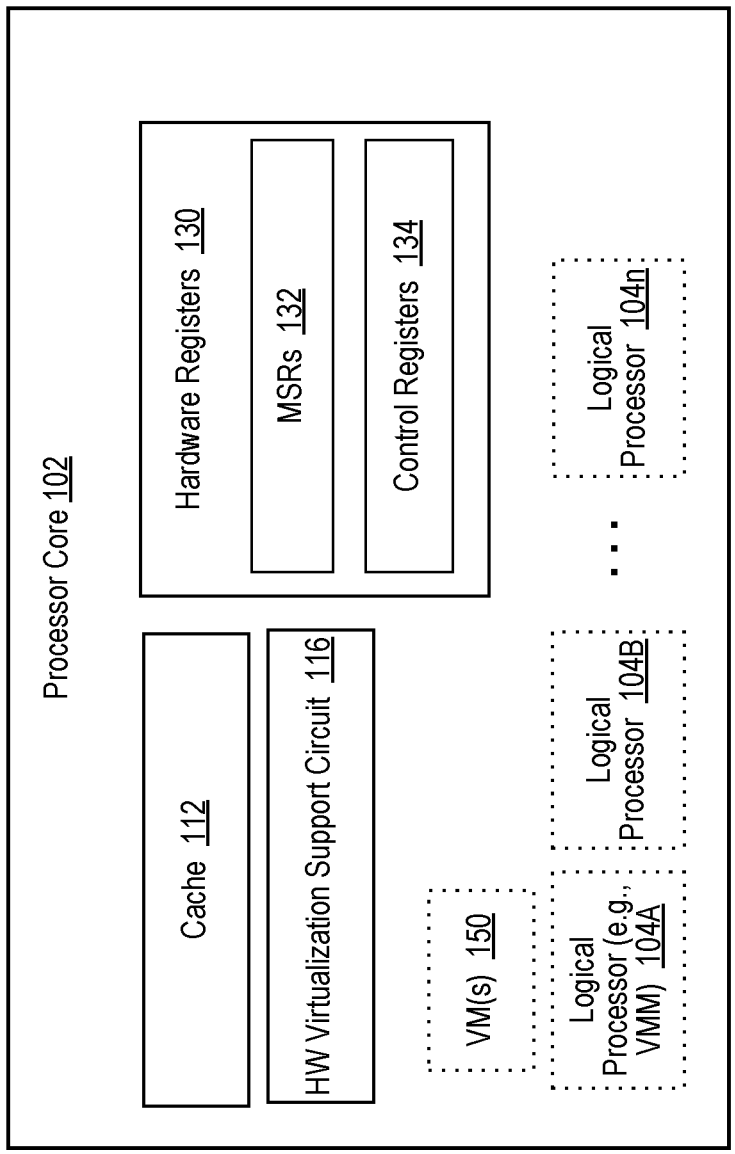

FIGS. 1A and 1B are a system block diagram of a computing device 100 for restricting usage of encryption keys by untrusted software according to various implementations. In one implementation, the computing device 100 may include a processor 101, secondary storage 115, communication circuitry 117, and memory 140 and/or other memory device coupled as illustrated and discussed herein. The processor 101 may further include one or more processor core 102, a cryptographic engine 110, a memory controller 120 (e.g., a memory management unit), and a last level cache (LLC) 114. The processor 101 may be embodied as a single or multi-core processor(s), digital signal processor, microcontroller, or other processor or processing/controlling circuit.

As illustrated in FIG. 1B, each processor core 102 may include cache 112, a hardware virtualization support circuit 116, and hardware registers 130. The processor core 102 may execute instructions to run a number of hardware threads, also known as logical processors, including the first logical processor 104A, a second logical processor 104B, and so forth until an Nth logical processor 104n. In one implementation, the first logical processor 104A is a virtual machine monitor (VMM) or hypervisor. A number of virtual machines (VMs) 150 may be executed and controlled by the VMM. Additionally, as discussed, the VMM may assign key IDs, which are associated with corresponding encryption keys, to various secure domains (e.g., VMM, VMs) operating on the computing device 100.

With further reference to FIG. 1B, the hardware registers 130 may include, for example, a number of model-specific registers 132 (or MSRs) and control registers 134 (e.g., CR1, CR2, CR3, and the like). The memory 140 may further include page tables 142 for paging, and guest pages tables 144 and extended page tables (EPT) 146 used for address translations by the VMM as will be described in more detail with reference to FIGS. 4 and 5A-5B.

In one implementation, the computing device 100 is a server that services the domains, e.g., different workloads such as a client machine, an operating system, an application, or other types of workloads being supported. In implementations, the memory controller 120 may include (or be coupled to) a cryptographic engine 110 (such as a MK-TME engine) having a key data structure 105, which will be discussed in more detail.

In various implementations, the cryptographic engine 110 may be embodied as a microcontroller, microprocessor, functional block, logic, or other circuit or collection of circuits capable of performing the functions described herein. The cryptographic engine 110 may encrypt and/or decrypt domain data read from or written to memory using domain-specific encryption keys, and therefore may work in conjunction with the memory controller 120 or be integrated within the memory controller 120. The cryptographic engine 110 may cache the internal key data structure 105, which the cryptographic engine 110 may use to identify domain accesses to be protected. The key data structure 105 may be a table or other data structure capable of being indexed and stored within hardware of the cryptographic engine 110. In one implementation, the hardware is a cache, a set of registers, or other flash memory.

Accordingly, the key data structure 105 may be controlled and/or programmed by hardware of the cryptographic engine 110 or by trusted software, for example using a crypto engine programming support circuit of the processor 101. The key data structure 105 may be adapted to store keys and domain information for the domains. The encryption keys and/or other secret information of the key data structure 105 may not be available to untrusted software. In some implementations, the cryptographic engine 110 may be incorporated along with the memory controller 120 and the processor core 102 in a system-on-a-chip (SoC) of the computing device 100.

Figure 2A:
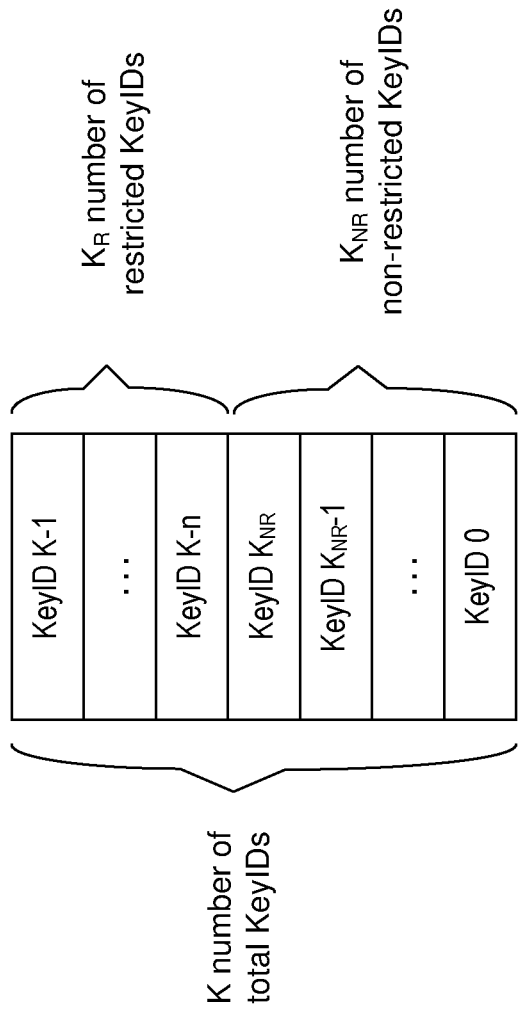
FIG. 2A is a block diagram illustrating cryptographic key identifiers (ID) delineated between restricted and non-restricted key IDs according to an implementation.

FIG. 2A is a block diagram illustrating cryptographic key identifiers (ID) delineated between restricted and non-restricted key IDs according to an implementation. These key IDs may be stored in the key data structure 105 in relation to the encryption keys to which they correspond. In some implementations, the architecture of the computing device 100 supports both restricted and non-restricted key IDs.

If there are K total number of available encryption key IDs, then $K_R$ is the number of restricted keys, and $K_{NR}$ is the number of non-restricted keys where $K=K_{NR}+K_R$. A boundary between restricted and non-restricted key IDs may be defined as any key ID by BIOS or other privileged software. If the key ID range of the restricted key IDs is embedded within a key ID range of the non-restricted key IDs, the BIOS may further define a second key ID as a second boundary. Thus, the first boundary may define a lower limit and the second boundary may define an upper limit of a range of restricted key IDs. After defining the boundary (or boundaries), the cryptographic engine 110 may be informed of the definition (through an MSR write or a macro-instruction) and this definition may be fixed until a reset of the cryptographic engine 110. In this way, the processor core may determine that a value of a key ID is restricted when it is between $K_{NR}$ and K-1 in the range of key IDs.

Figure 2B:
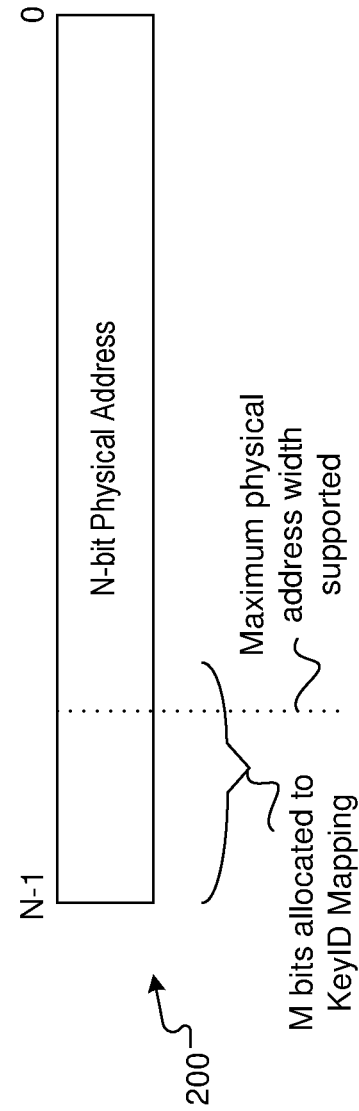
FIG. 2B is a block diagram of a physical memory address that includes a portion of the address bits allocated to key IDs according to various implementations.

FIG. 2B is a block diagram of an n-bit physical memory address 200 that includes a portion of the address bits allocated to key IDs according to various implementations. This portion of address bits may encompass M bits, which may be at least $Log_2K$. The dotted line in FIG. 2B illustrates a maximum physical address width that is supported. Accordingly, use of at least some of upper address bits of the physical memory address to encode for key IDs may be advantageous. In other implementations, however, the M bits for the key IDs may be located elsewhere within the physical memory address, including beyond the maximum physical address width.

Operation with MK-TME may be enabled and configured by BIOS, upon boot of the computing system 100, using a TME_ACTIVATE MSR within the MSRs 132. To enable MKTME, TME Enable RWL bit in the TME_ACTIVATE MSR may be set and bits 35:32 are to have a non-zero value (which will specify the number of Key ID bits configured for MK-TME). These MK_TME_KEYID_BITS are the number of key ID bits to allocate to MK-TME usage. Similar to enumeration, this is an encoded value. Writing a value greater than MK_TME_MAX_KEYID_BITS may result in general protection fault (#GP). Writing a non-zero value to this field may also result in a general protection fault if bit 1 of EAX (TME Enable) is not also set to '1,' as TME is to be enabled to use MK-TME. The TME_ACTIVATE MSR may also be used to lock other TME-related MSRs (e.g., EXCLUD_MASK, EXCLUDE_BASE), so that any write to the MSRs after they are locked will be ignored. The lock may be reset when the computing system 100 is reset.

In implementations, when the computing system 100 is booted, the BIOS may store particular information in the TME_ACTIVATE MSR for later use by the processor 101 (e.g., the cryptographic engine 110 and/or the memory controller 120) in restricting access to the restricted encryption keys and key IDs. This information may include a bit range for a number of address bits of physical memory addresses (e.g., host physical addresses) used for key IDs. The particular information stored by BIOS into the TME_ACTIVATE MSR may further include a first key identifier (ID), of the key IDs, to identify a boundary between non-restricted key IDs and restricted key IDs of the key identifiers. Furthermore, in one implementation, an additional key ID may be stored in the TME_ACTIVATE MSR that forms a second boundary where the restricted key IDs are embedded inside of a range of address bits for non-restricted key IDs.

With continued reference to FIGS. 1A and 1B, the first logical processor 104A may execute a virtual machine monitor (VMM), which may issue a memory transaction towards the memory 140. The memory transaction may include an address (e.g., a memory address) that is associated with a second key ID. The cryptographic engine 110 (or the processor core 102 on behalf of the cryptographic engine 110) may access a processor state of the first logical processor, e.g., that is stored in the CR3 register of the control registers 134. The cryptographic engine 110 may determine that the state indicates the first logical processor executes in an untrusted domain mode. The cryptographic engine 110 may further determine the second key ID is within the key ID range of the restricted key IDs, and generate a fault related to a type of access to the second key ID by the first logical processor.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. The computing device 100 may include other or additional components, such as those commonly found in a desktop computer (e.g., various input/output devices), in other implementations. Additionally, in some implementations, one or more of the illustrative components may be incorporated in, or otherwise form a portion of, another component. For example, the memory 140, or portions thereof, may be incorporated in the processor core in some implementations.

The hardware virtualization support circuit 116 (FIG. 1B) may support virtualized execution of operating systems, applications, and other software by the computing device 100. The hardware virtualization support circuit 116 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, the VMM, or host operating system (OS) may execute in VMX-root mode. The VMX non-root mode restricts access to certain hardware instructions while still implementing the ordinary ring/privilege system of the processor core. One or more guest OSs (e.g., of the VMs 150) may execute in the VMX non-root mode. Those guest OSs may execute in ring zero, similar to being executed without virtualization. The hardware virtualization support circuit 116 may also support extended page tables (EPT), which may be embodied as hardware-assisted second-level page address translation. The hardware virtualization support circuit 116 may be embodied as, for example, Intel® VT-x technology.

The memory 140 may be embodied as any type of volatile or non-volatile memory or data storage capable of performing the functions described herein. In operation, the memory 140 may store various data and software used during operation of the computing device 100 such as operating systems, applications, programs, libraries, and drivers. The memory controller 120 may be coupled to the memory 140 to store to and fetch from the memory, which in some cases may depend on misses to the cache 112.

The secondary storage device 115 may be embodied as any type of device or devices configured for short-term or long-term storage of data such as, for example, memory devices and circuits, memory cards, hard disk drives, solid-state drives, or other data storage devices. In some implementations, the secondary storage device 115 may be used to store the contents of one or more secure enclaves. When stored by the secondary storage device 115, the contents of the secure enclave may be encrypted to prevent unauthorized access.

The communication circuitry 117 of the computing device 100 may be embodied as any communication circuit, device, or collection thereof, capable of enabling communications between the computing device 100 and other remote devices over a network. The communication circuitry 117 may be configured to use any one or more communication technology (e.g., wired or wireless communications) and associated protocols (e.g., Ethernet, Bluetooth®, Wi-Fi®, WiMAX, and the like) to effect such communication.

Figure 3:
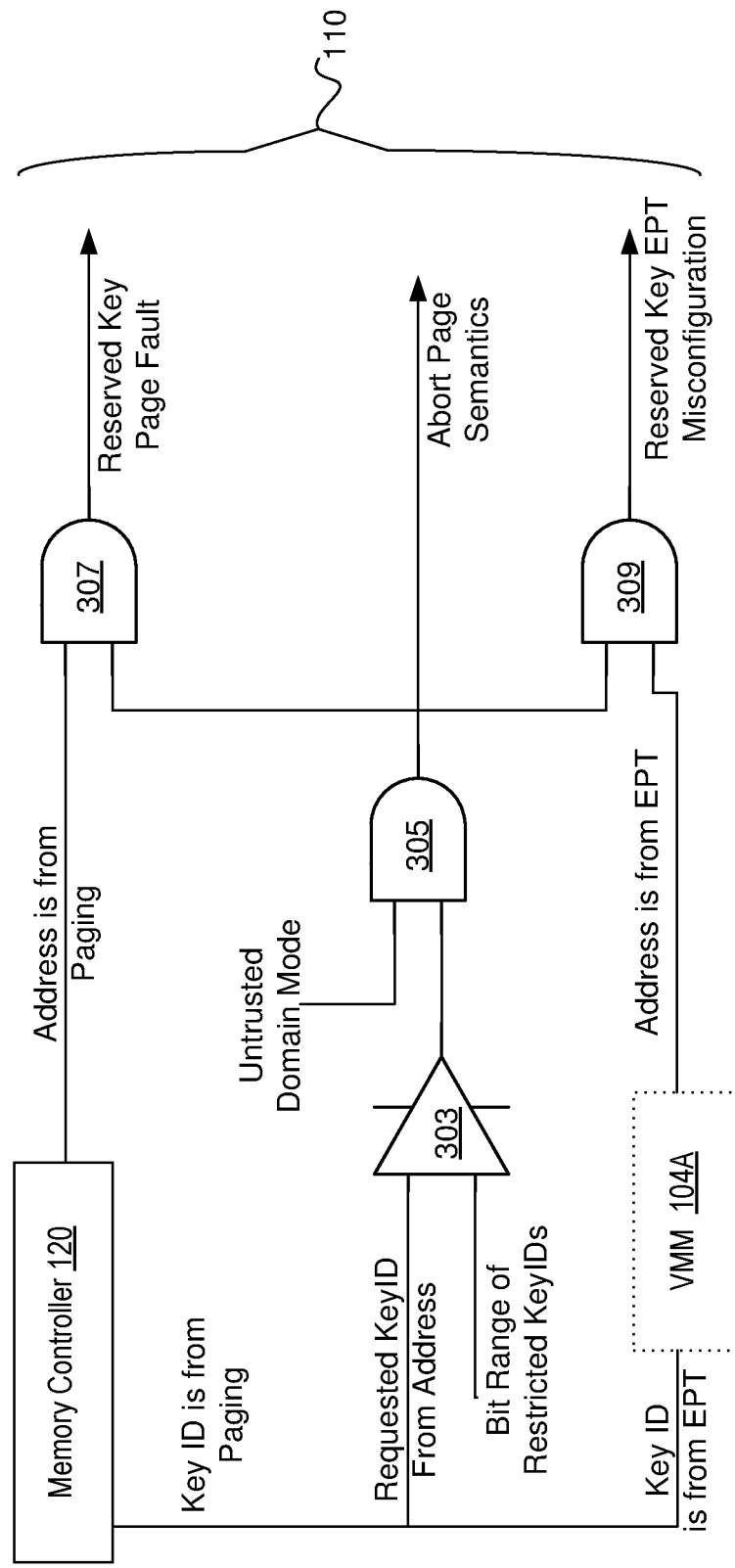
FIG. 3 is a block diagram of a portion of a cryptographic engine of the computing device of FIG. 1, according to various implementations.

FIG. 3 is block diagram of a portion of the cryptographic engine 110 of the computing device 100 of FIG. 1, according to various implementations. The cryptographic engine 110 may include a comparator 303, a first AND gate 305, a second AND gate 307, and a third AND gate 309. In implementations, this hardware may be replicated for each logical processor of the processor core 102, or may interleave functionality across the logical processors using a single set of hardware. Assume, for purposes of explanation, that the first logical processor 104A (e.g., the VMM) has issued a memory transaction, which includes an address, towards the memory 140. The cryptographic engine 110 may work with the memory controller 120 to determine whether the memory transaction includes an access to a restricted key ID.

The cryptographic engine 110 may determine, via access to the TME_ACTIVATE MSR, a key ID range of the restricted key IDs within the physical memory addresses and at least a first key ID to identify a boundary between non-restricted key IDs and restricted key IDs of available key identifiers. The cryptographic engine 110 may determine, from this information, the key ID range of restricted key IDs with a physical memory address, which is one input into the comparator 303. The cryptographic engine 110 may further receive an identity of the requested key ID from the address in the memory transaction, which may be another input into the comparators 303. The comparator 303 may compare these values to determine whether the requested key ID associated with the memory transaction is within the key ID range of the restricted key IDs, and output the result.

In implementations, the output from the comparator 303 may be fed as an input into the first AND gate 305. An indication that the first logical processor 104A executes in the untrusted domain mode may be received from a control register (e.g., the CR3), as another input to the first AND gate 305. The combination of these two inputs results in an output of a fault that may be recognized by the processor core 102, and handled according to the particular fault. The memory controller 120 may further block access, by the first logical processor, to the memory location (in the memory 140) of the address associated with the second key ID.

In implementations, the fault may vary depending on the type of access to the restricted key ID by the first logical processor 104A. A first type may be where the address of the memory transaction is a physical memory address and the access is therefore an attempt at direct-physical mapped access to the second key ID. That is, the second key ID may be directly appended to the physical memory address. In this situation, the cryptographic engine 110 may generate abort-page semantics for the access. Accordingly, the memory controller 120 may ignore further write transactions to the memory location from the logical processor; and return all one values (1's) in response to further read transactions to the memory location.

In a second type of access, the address in the memory transaction may be a linear address that is mapped to the physical memory address through paging, which will be discussed in more detail with reference to FIG. 4. In this situation, the cryptographic engine 110 may receive, from the memory controller 120, the second key ID and an indication that the physical memory address (and thus the second key ID) is obtained from paging. The second AND gate 307 may receive this indication as an input and may receive the output of the first AND gate 305 as another input. In one implementation, when both of these inputs are asserted as true, the resulting fault may be a reserved key page fault associated with an attempt to set a reserved bit within a page table during paging.

In a third type of access, the address in the memory transaction may be a guest virtual address (GVA). The GVA may be mapped to a guest physical address (GPA), which is in turn mapped to a host physical address (HPA), which is the physical memory address to which this disclosure refers. The VMM (e.g., the first logical processor 104A) may translate the GVA to the GPA by a walk of the guest page tables 144 and the GPA to the HPA by a walk of the extended page tables (EPT) 146, which will be discussed in more detail with reference to FIGS. 5A-5B.

With further referenced to the third type of access, the VMM may extract the physical memory address and the second key ID through the translations just discussed. The VMM may further send, to the cryptographic engine 110, the second key ID and an indication that the physical memory address is obtained through the EPT 146. The third AND gate 309 may receive this indication and an output from the first AND gate 305. In one implementation, when both of these inputs are asserted as true, the resulting fault may be a reserved key EPT misconfiguration fault associated with configuration of an EPT paging-structure entry reserved for future functionality.

Additional or different faults are envisioned in alternative implementations, but by using abort page semantics, reserved key page fault, and reserved key EPT misconfiguration for faults generated from these three types of accesses, the processor core 102 is already equipped to detect and appropriately handle such faults. In other words, the hardware of the cryptographic engine discussed with reference to FIG. 3 may instantiate new ways to generate existing faults in the processor microarchitecture discussed herein.

Figure 4:
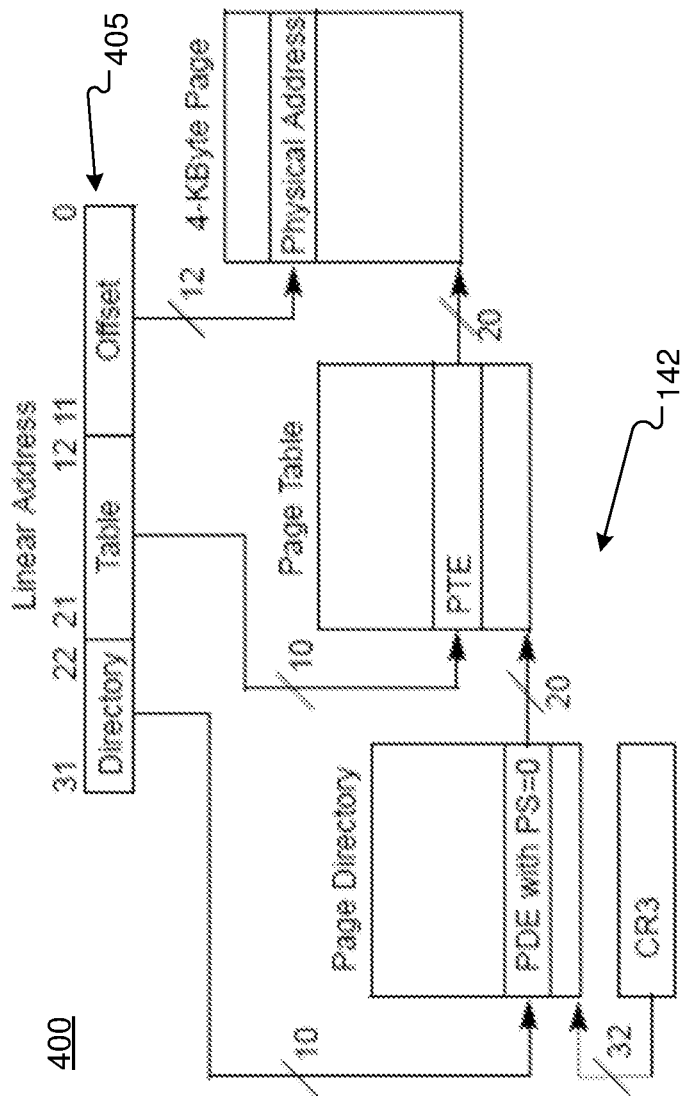
FIG. 4 is a block diagram of pages tables associated with translation of a linear address to a physical memory address using paging according to an implementation.

FIG. 4 is a block diagram of pages tables 400 associated with translation of a linear address 405 to a physical memory address using paging according to an implementation. Paging supports a virtual memory environment where a large linear address space is simulated with a small amount of physical memory (RAM and ROM) and some disk storage. When using paging, each segment is divided into pages (e.g., 4 KBytes each in size), which are stored either in the memory 140 or on disk, e.g., the secondary storage 115. The operating system and/or the memory controller 120 can maintain a page directory and a set of page tables to keep track of the pages. When a program (or task) attempts to access an address location in the linear address space, the memory controller 120 may use the page directory and page tables to translate the linear address into a physical address and then performs the requested operation (read or write) on the memory location.

If the page being accessed is not currently in physical memory, the processor interrupts execution of the program (by generating a page-fault exception). The memory controller 120 may then read the page into physical memory from the disk and continues executing the program.

With continued reference to FIG. 4, the linear address 405 may be partitioned into page directory (PDE) bits, page table bits, and an offset. The PDE bits may act as a pointer into a page directory table (PDT) located via one of the bits in the CR3 control register. The address to which the PDE bits point within the PDT table may then act as a pointer to locate the correct page table in memory. The page table bits point to a page table entry (PTE) within the located page table. The PTE may then act as a pointer to the address of the correct 4-Kbte page in memory within which the offset points to the physical memory address.

Figure 5A:
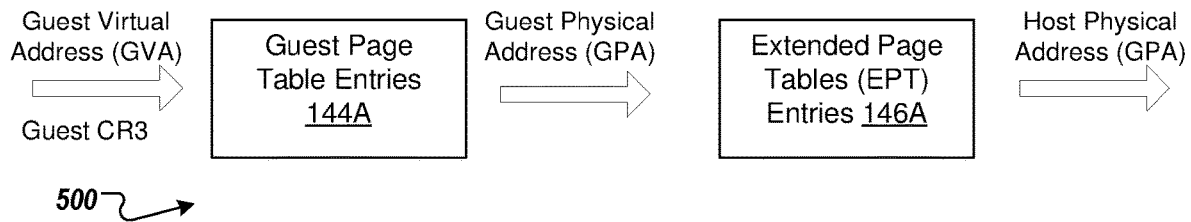
FIG. 5A is a block diagram illustrating translation of a guest virtual address to a guest physical address and of a guest physical address to a host physical address, according to an implementation.

FIG. 5A is a block diagram 500 illustrating translation of a guest virtual address (GVA) to a guest physical address (GPA) and of the GPA to a host physical address (HPA), or a physical memory address, according to an implementation. In one implementation, in order to emulate an instruction on behalf of a virtual machine, the VMM may need to translate a linear address (e.g., a GVA) used by the instruction to a physical memory address such that the VMM can access data at that physical address. As discussed, the VMM may also gain access to an appended key ID without the safeguards put in place as discussed within this disclosure.

In order to perform that translation, the VMM may need to first determine paging and segmentation including examining a segmentation state of the virtual machine (VM) 150. The VMM may also determine a paging mode of the VM 150 at the time of instruction invocation, including examining page tables set up by the VM and examining the control registers 134 and MSRs programmed by the VM 150. Following discovery of paging and segmentation modes, the VMM may generate a GVA for a logical address, and detect any segmentation faults.

Assuming no segmentation faults are detected, the VMM may translate the GVA to a GPA and the GPA to an HPA, including performing a page table walk in software. To perform these translations in software, the VMM may load a number of paging structure entries and EPT structure entries originally set up by the VM 150 into general purpose registers or memory. Once these paging and EPT structure entries are loaded, the VMM may perform the translations by modeling translation circuitry such as a page miss handler (PMH).

More specifically, with reference to FIG. 5A, the VMM may load a plurality of guest page table entries 144A from the guest page tables 144 and a plurality of extended page table entries 146A from the EPT 146 that were established by the VM 150. The VMM may then perform translation by walking (e.g., sequentially searching) through the guest page table entries 144A to generate a GPA from the GVA. The VMM may then use the GPA to walk (e.g., sequentially search) the EPT 146 to generate the HPA associated with the GPA. Use of the EPT 146 is a feature that can be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access physical memory.

Figure 5B:
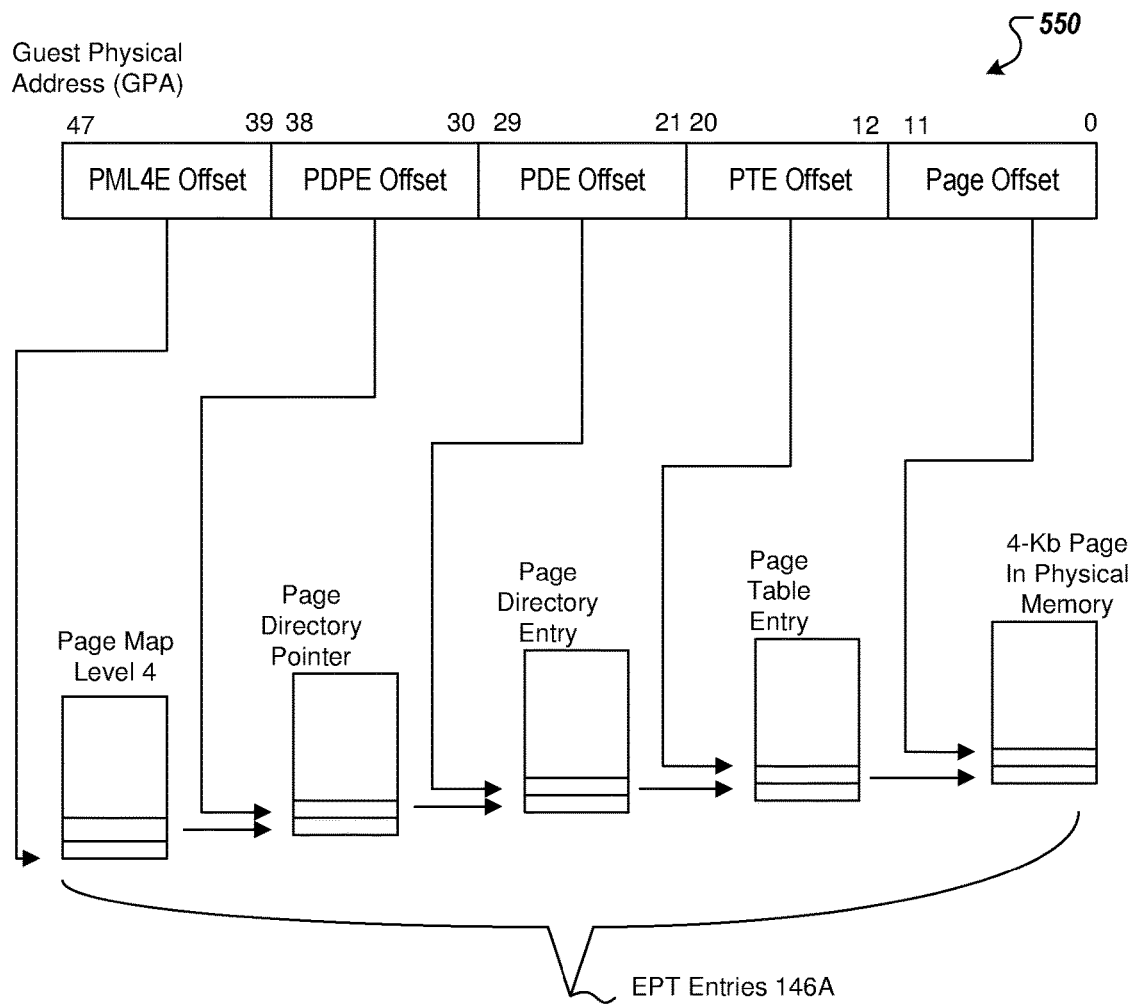
FIG. 5B is a block diagram illustrating use of extended page tables (EPT) to translate a guest physical address to the host physical address, according to an implementation.

FIG. 5B is a block diagram 550 illustrating how the VMM may walk the extended page table entries 144A to translate a GPA to an HPA, according to one implementation. For example, the guest physical address (GPA) may be broken into a series of offsets, each to search within a table structure of a hierarchy of the EPT entries 146A. In this example, the EPT from which the EPT entries are derived includes a four-level hierarchal table of entries, including a page map level 4 table, a page directory pointer table, a page directory entry table, and a page table entry table. (In other embodiments, a different number of levels of hierarchy may exist within the EPT, and therefore, the disclosed embodiments are not to be limited by a particular implementation of the EPT.) A result of each search at a level of the EPT hierarchy may be added to the offset for the next table to locate a next result of the next level table in the EPT hierarchy. The result of the fourth (page table entry) table may be combined with a page offset to locate a 4 Kb page (for example) in physical memory, which is the host physical address.

Figure 6:
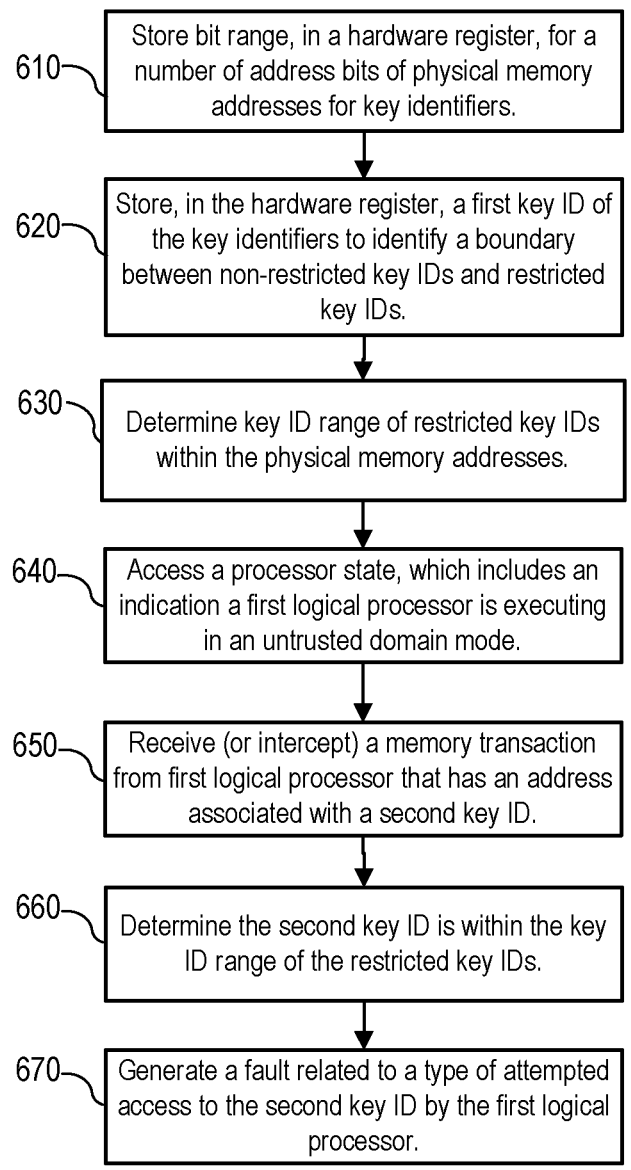
FIG. 6 is a flow chart of a method for restricting usage of key IDs, associated with addresses within memory transactions, by untrusted software, according to various implementations.
Figure 7:
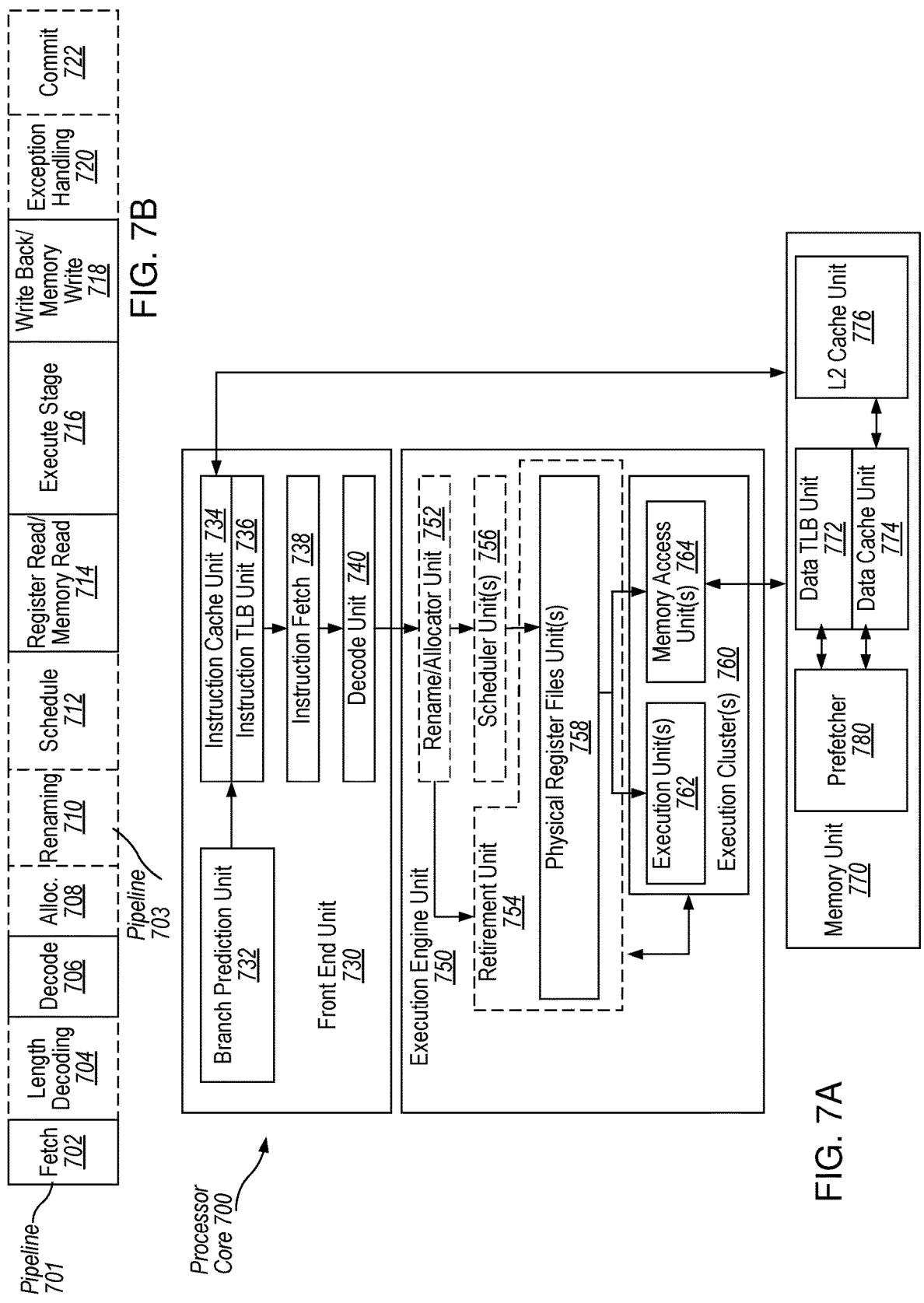
FIG. 7A is a block diagram illustrating an in-order pipeline and a register renaming stage, out-of-order issue/execution pipeline according to one implementation.
FIG. 7B is a block diagram illustrating a micro-architecture for a processor or an integrated circuit that may implement hardware support for a multi-key cryptographic engine, according to an implementation of the disclosure.

FIG. 6 is a flow chart of a method 600 for restricting usage of key IDs, associated with addresses within memory transactions, by untrusted software, according to various implementations. Accordingly, the method 600 may be performed by processing logic that may comprise hardware (e.g., circuitry, dedicated logic, programmable logic, microcode, etc.), firmware, or a combination thereof. In one implementation, method 600 is performed by processor 101 of FIG. 1, e.g., by the cryptographic engine 110 and/or the memory controller 120. In another implementation, the method 600 is performed by any of the processors described with respect to FIGS. 7A-13.

With further reference to FIG. 6, the method 600 may begin with the processing logic storing, in a hardware register of the processor core 102, a bit range for a number of address bits of physical memory addresses used for key identifiers (IDs) (610). The key IDs are associated with domain-specific encryption keys. The method 600 may continue with the processing logic storing, in the hardware register, a first key identifier (ID), of the key IDs, to identify a boundary between non-restricted key IDs and restricted key IDs of the key IDs (620). The method 600 may continue with the processing logic determining, via access to the bit range and the first key ID, a key ID range of the restricted key IDs within the physical memory addresses (630). The method 600 may continue with the processing logic accessing a processor state, e.g., an indication that a first logical processor of the processor core is executing in an untrusted domain mode (640). The method 600 may continue with the processing logic intercepting a memory transaction from the first logical processor that includes an address associated with a second key ID (650). The method 600 may continue with the processing logic determining the second key ID is within the key ID range of the restricted key IDs (660). The method 600 may continue with the processing logic generating a fault related to a type of access to the second key ID by the first logical processor (670).

FIG. 7A is a block diagram illustrating a micro-architecture for a processor 700 that implements hardware support for restricting usage of encryption keys by untrusted software, according to an implementation. Specifically, processor 700 depicts an in-order architecture core and a register renaming logic, out-of-order issue/execution logic to be included in a processor according to at least one implementation of the disclosure.

Processor 700 includes a front end unit 730 coupled to an execution engine unit 750, and both are coupled to a memory unit 770. The processor 700 may include a reduced instruction set computing (RISC) core, a complex instruction set computing (CISC) core, a very long instruction word (VLIW) core, or a hybrid or alternative core type. As yet another option, processor 700 may include a special-purpose core, such as, for example, a network or communication core, compression engine, graphics core, or the like. In one implementation, processor 700 may be a multi-core processor or may be part of a multi-processor system.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 740 may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different scheduler circuits, including reservations stations (RS), central instruction window, etc. The scheduler unit(s) 756 is coupled to the physical register set(s) unit(s) 758. Each of the physical register set(s) units 758 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 758 is overlapped by the retirement unit 754 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register set(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 756, physical register set(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which may include a data prefetcher 780, a data TLB unit 772, a data cache unit (DCU) 774, and a level 2 (L2) cache unit 776, to name a few examples. In some implementations DCU 774 is also known as a first level data cache (L1 cache). The DCU 774 may handle multiple outstanding cache misses and continue to service incoming stores and loads. It also supports maintaining cache coherency. The data TLB unit 772 is a cache used to improve virtual address translation speed by mapping virtual and physical address spaces. In one exemplary implementation, the memory access units 764 may include a load unit, a store address unit, and a store data unit, each of which is coupled to the data TLB unit 772 in the memory unit 770. The L2 cache unit 776 may be coupled to one or more other levels of cache and eventually to a main memory.

In one implementation, the data prefetcher 780 speculatively loads/prefetches data to the DCU 774 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 700 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 7B is a block diagram illustrating an in-order pipeline and a register renaming stage, out-of-order issue/execution pipeline implemented by processor 700 of FIG. 7A according to some implementations of the disclosure. The solid lined boxes in FIG. 7B illustrate an in-order pipeline 701, while the dashed lined boxes illustrate a register renaming, out-of-order issue/execution pipeline 703. In FIG. 7B, the pipelines 701 and 703 include a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 720, and a commit stage 722. In some implementations, the ordering of stages 702-724 may be different than illustrated and are not limited to the specific ordering shown in FIG. 7B.

Figure 8:
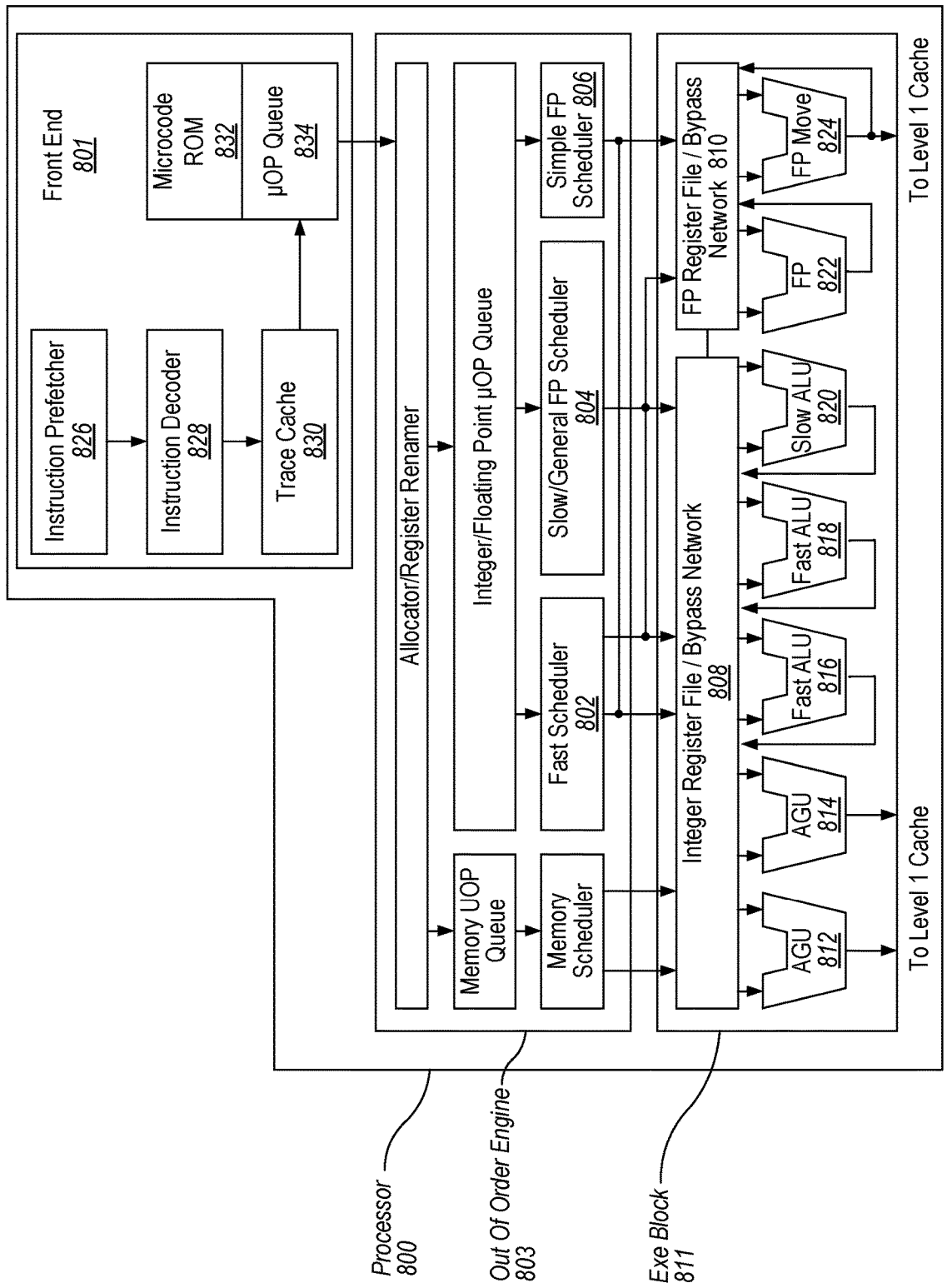
FIG. 8 illustrates a block diagram of the micro-architecture for a processor or an integrated circuit that implements hardware support for a multi-key cryptographic engine, according to an implementation of the disclosure.

FIG. 8 illustrates a block diagram of the micro-architecture for a processor 800 that includes logic circuits of a processor or an integrated circuit that implements hardware support for restricting usage of encryption keys by untrusted software, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 801 is the part of the processor 800 that fetches instructions to be executed and prepares them to be used later in the processor pipeline. The implementations of the page additions and content copying can be implemented in processor 800.

The front end 801 may include several units. In one implementation, the instruction prefetcher 826 fetches instructions from memory and feeds them to an instruction decoder 828 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, microcode ROM (or RAM) 832 provides the uops needed to complete the operation.

Some instructions are converted into a single micro-op, whereas others need several micro-ops to complete the full operation. In one implementation, if more than four micro-ops are needed to complete an instruction, the instruction decoder 828 accesses the microcode ROM 832 to do the instruction. For one implementation, an instruction can be decoded into a small number of micro ops for processing at the instruction decoder 828. In another implementation, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processor clock cycle. The schedulers arbitrate for the dispatch ports to schedule uops for execution.

Register sets 808, 810, sit between the schedulers 802, 804, 806, and the execution units 812, 814, 816, 818, 820, 822, 824 in the execution block 811. There is a separate register set 808, 810, for integer and floating point operations, respectively. Each register set 808, 810, of one implementation also includes a bypass network that can bypass or forward just completed results that have not yet been written into the register set to new dependent uops. The integer register set 808 and the floating point register set 810 are also capable of communicating data with the other. For one implementation, the integer register set 808 is split into two separate register sets, one register set for the low order 32 bits of data and a second register set for the high order 32 bits of data. The floating point register set 810 of one implementation has 128 bit wide entries because floating point instructions typically have operands from 64 to 128 bits in width.

The execution block 811 contains the execution units 812, 814, 816, 818, 820, 822, 824, where the instructions are actually executed. This section includes the register sets 808, 810, that store the integer and floating point data operand values that the micro-instructions need to execute. The processor 800 of one implementation is comprised of a number of execution units: address generation unit (AGU) 812, AGU 814, fast ALU 816, fast ALU 818, slow ALU 820, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 820 as the slow ALU 820 includes integer execution hardware for long latency type of operations, such as a multiplier, shifts, flag logic, and branch processing. Memory load/store operations are executed by the AGUs 822, 824. For one implementation, the integer ALUs 816, 818, 820, are described in the context of performing integer operations on 64 bit data operands. In alternative implementations, the ALUs 816, 818, 820, can be implemented to support a variety of data bits including 16, 32, 128, 256, etc. Similarly, the floating point units 822, 824, can be implemented to support a range of operands having bits of various widths. For one implementation, the floating point units 822, 824, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, CA These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 9:
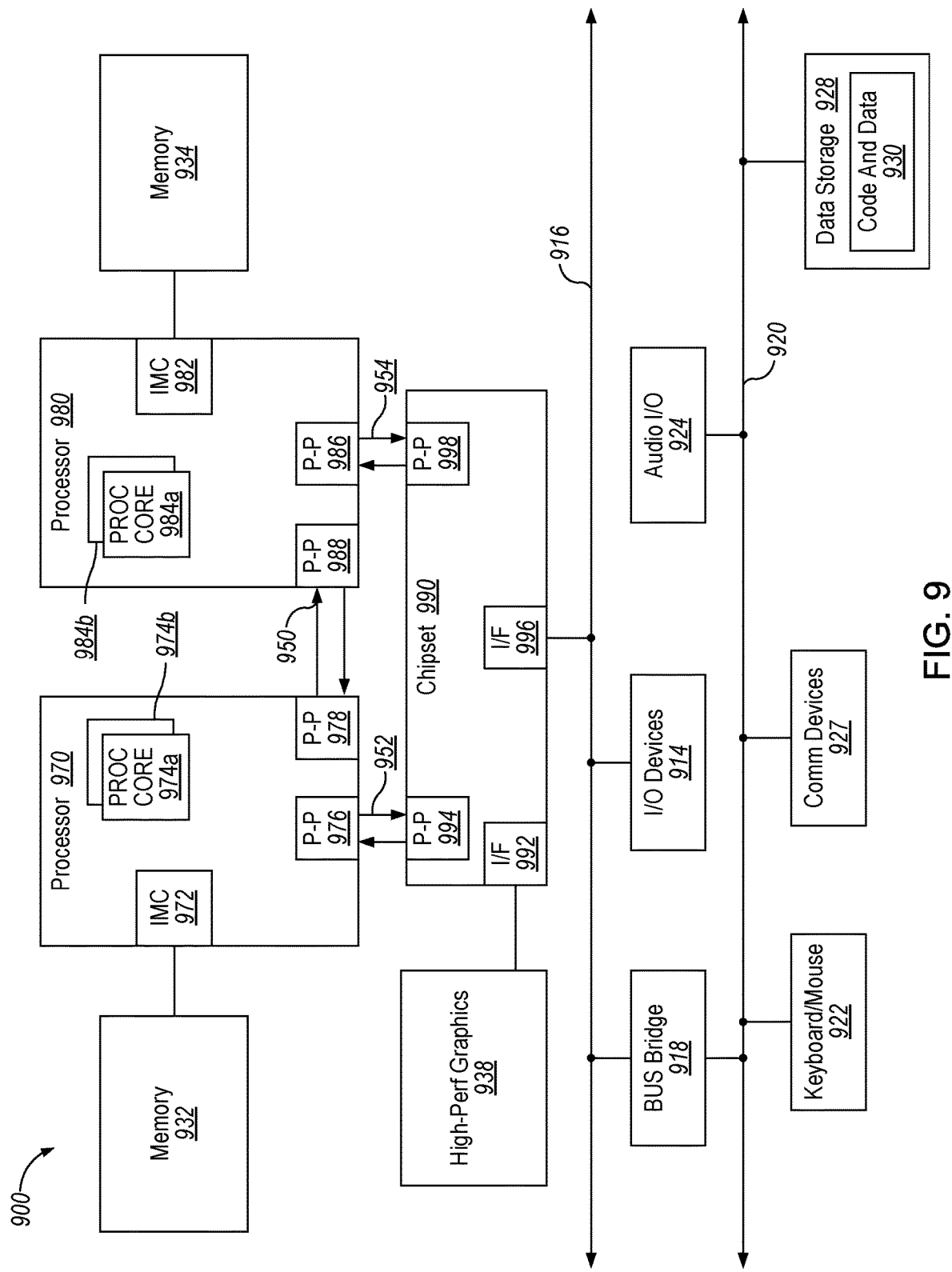
FIG. 9 is a block diagram of a computer system according to one implementation.

Implementations may be implemented in many different system types. Referring now to FIG. 9, shown is a block diagram of a multiprocessor system 900 that may implement hardware support for restricting usage of encryption keys by untrusted software, in accordance with an implementation. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. While shown with two processors 970, 980, it is to be understood that the scope of the disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may exchange information with a chipset 990 via individual P-P interfaces 952, 954 using point to point interface circuits 976, 994, 986, 998. Chipset 990 may also exchange information with a high-performance graphics circuit 938 via a high-performance graphics interface 992.

Chipset 990 may be coupled to a first bus 916 via an interface 996. In one implementation, first bus 916 may be a Peripheral Component Interconnect (PCI) bus, or a bus such as a PCI Express bus or interconnect bus, although the scope of the disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
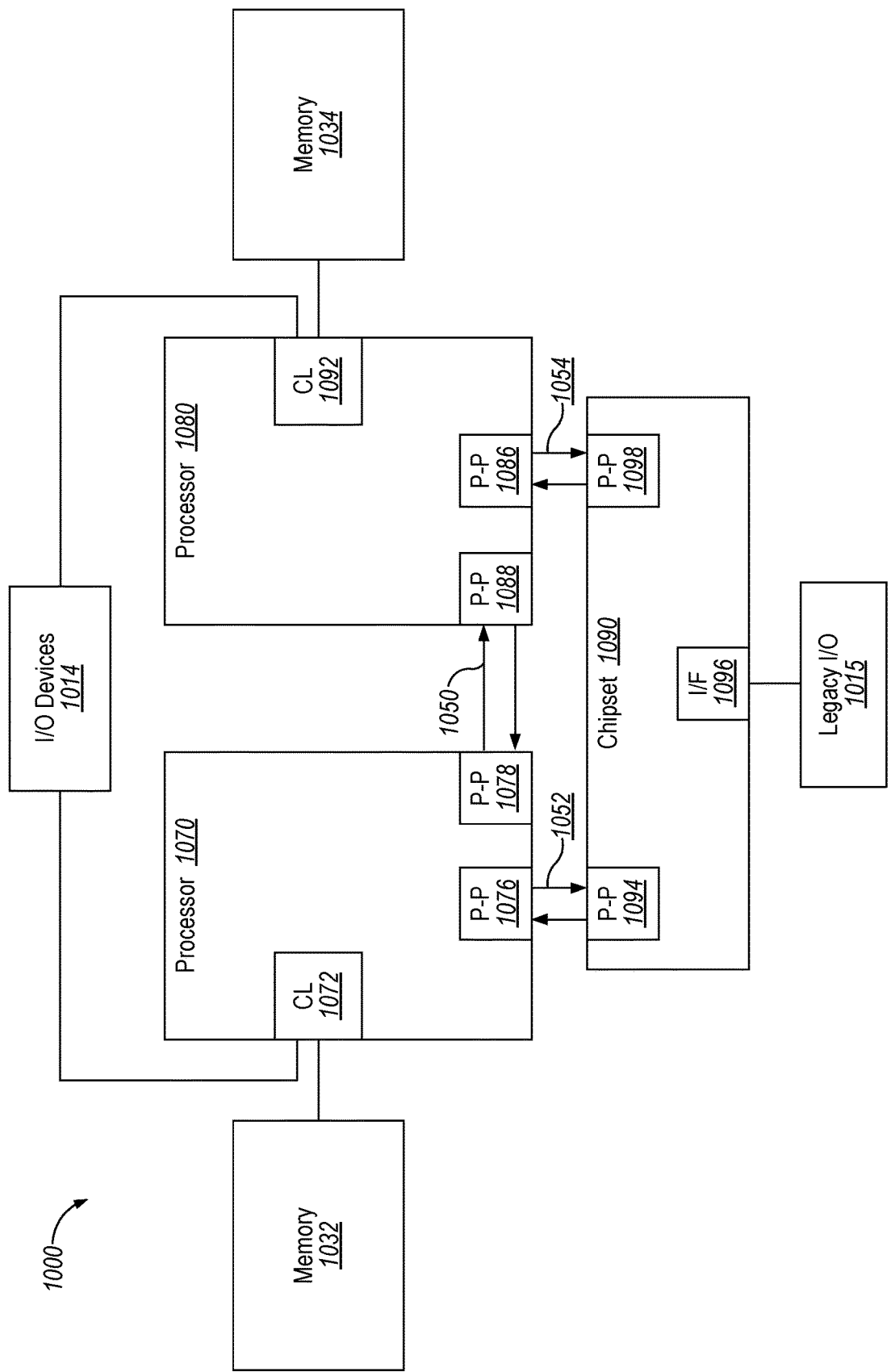
FIG. 10 is a block diagram of a computer system according to another implementation.

Referring now to FIG. 10, shown is a block diagram of a third system 1000 that may implement hardware support for restricting usage of encryption keys by untrusted software, in accordance with an implementation of the disclosure. Like elements in FIGS. 9 and 10 bear like reference numerals and certain aspects of FIG. 10 have been omitted from FIG. 9 in order to avoid obscuring other aspects of FIG. 9.

FIG. 10 illustrates processors 1070, 1080. In one embodiment, processors 970, 980 may implement hybrid cores as described above. Processors 1070, 1080 may include integrated memory and I/O control logic ("CL") 1072 and 1092, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one implementation, the CL 1072, 1082 may include integrated memory controller units such as described herein. In addition. CL 1072, 1092 may also include I/O control logic. FIG. 10 illustrates that the memories 1032, 1034 are coupled to the CL 1072, 1092, and that I/O devices 1014 are also coupled to the control logic 1072, 1092. Legacy I/O devices 1015 are coupled to the chipset 1090 via interface 1096.

Figure 11:
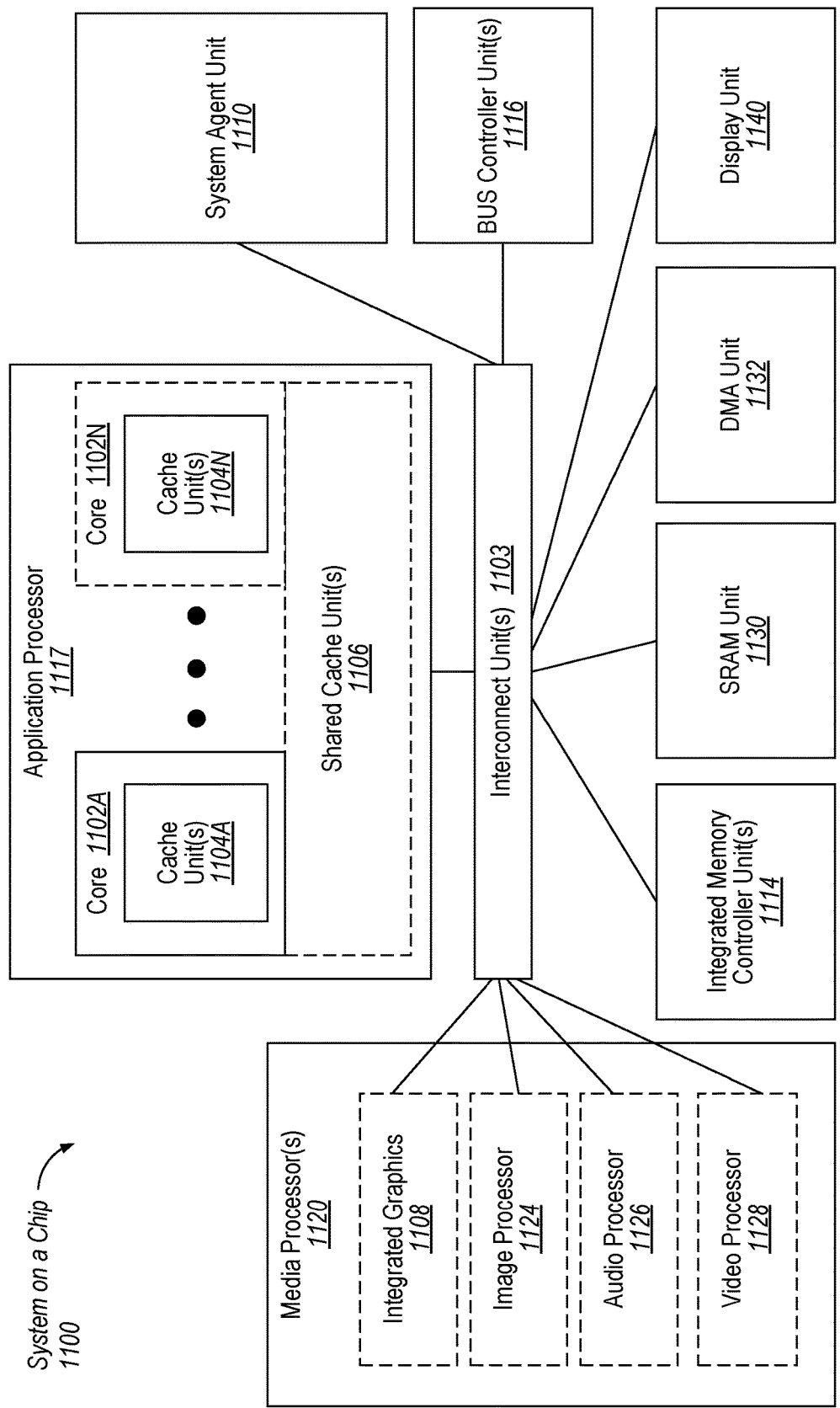
FIG. 11 is a block diagram of a system-on-a-chip according to one implementation.

FIG. 11 is an exemplary system on a chip (SoC) 1100 that may include one or more of the cores 1102A . . . 1102N that may implement hardware support for restricting usage of encryption keys by untrusted software. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1100 of FIG. 11, dashed lined boxes are features on more advanced SoCs. An interconnect unit(s) 1103 may be coupled to: an application processor 1117 which includes a set of one or more cores 1102A-N, containing one or more cache unit(s) 1104A . . . 1104N, respectively, and shared cache unit(s) 1106; a system agent unit 1110; a bus controller unit(s) 1116; an integrated memory controller unit(s) 1114; a set of one or more media processors 1120 which may include integrated graphics logic 1108, an image processor 1124 for providing still and/or video camera functionality, an audio processor 1126 for providing hardware audio acceleration, and a video processor 1128 for providing video encode/decode acceleration; a static random access memory (SRAM) unit 1130; a direct memory access (DMA) unit 1132; and a display unit 1140 for coupling to one or more external displays.

Figure 12:
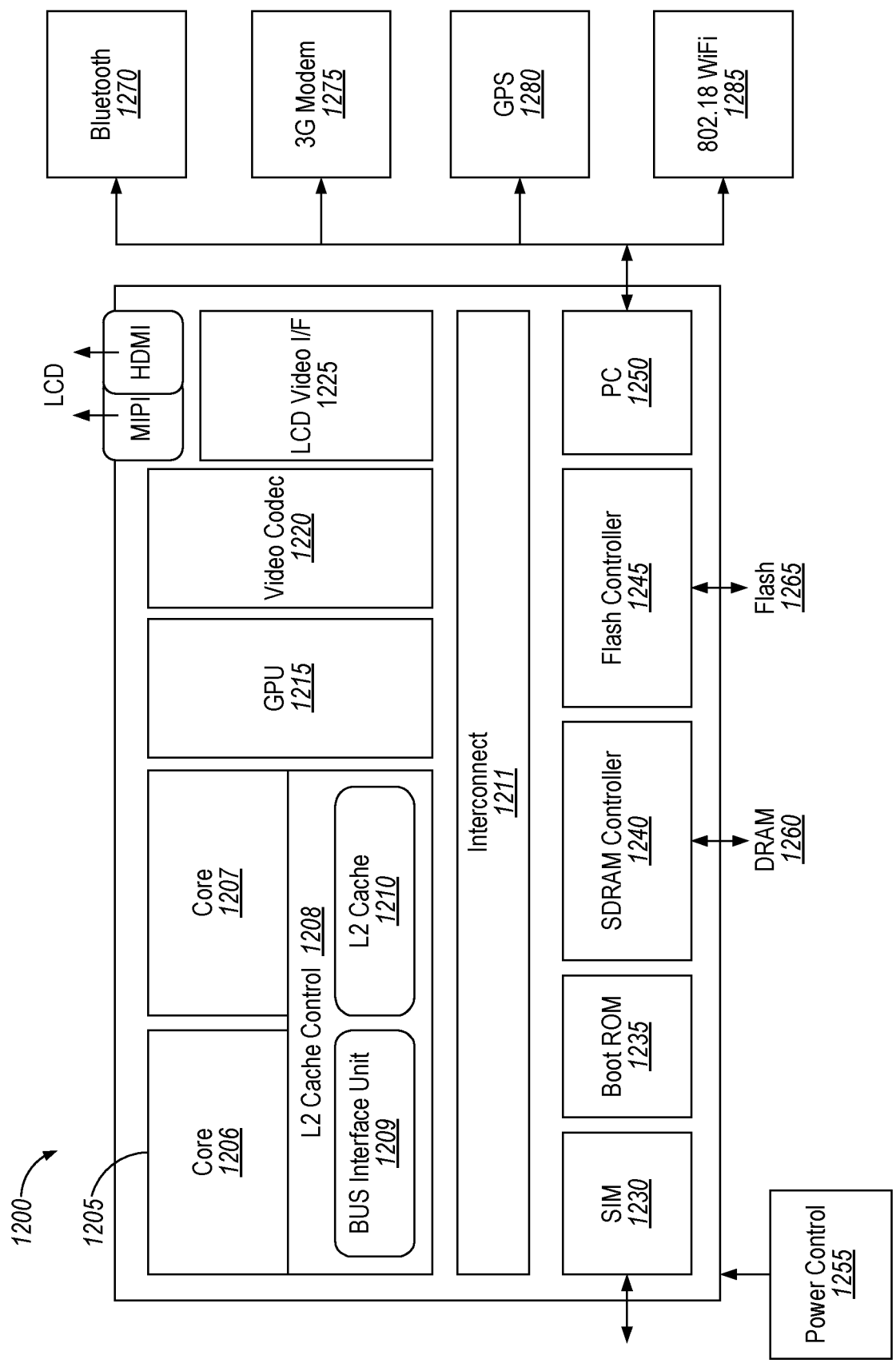
FIG. 12 illustrates another implementation of a block diagram for a computing system.

Turning next to FIG. 12, an implementation of a system on-chip (SoC) design that may implement hardware support for restricting usage of encryption keys by untrusted software, in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1200.

Here, SoC 1200 includes 2 cores—1206 and 1207. Similar to the discussion above, cores 1206 and 1207 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

In one implementation, SDRAM controller 1240 may connect to interconnect 1211 via cache 1210. Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a power control module 1255, a Bluetooth® module 1270, 3G modem 1275, GPS 1280, and Wi-Fi® 1285. Note as stated above, a UE includes a radio for communication. As a result, these peripheral communication modules may not all be included. However, in a UE some form of a radio for external communication should be included.

Figure 13:
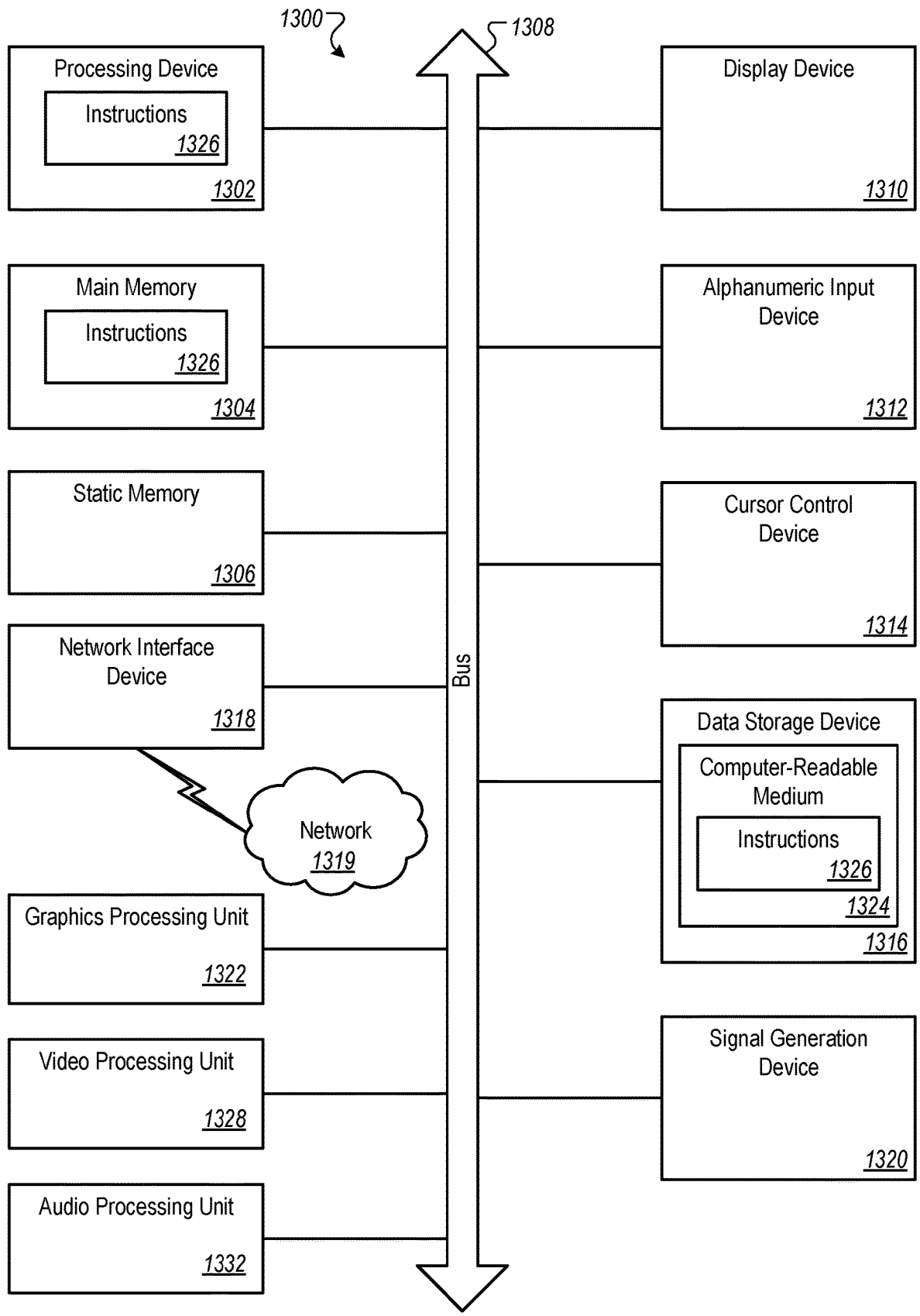
FIG. 13 illustrates another implementation of a block diagram for a computing system.

FIG. 13 illustrates a diagrammatic representation of a machine in the example form of a computing system 1300 within which a set of instructions, for causing the machine to implement hardware support for restricting usage of encryption keys by untrusted software according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1300.

The computing system 1300 includes a processing device 1302, main memory 1304 (e.g., flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1316, which communicate with each other via a bus 1308.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application-specific integrated circuit (ASIC), a field programmable gate array (FPGA), a digital signal processor (DSP), network processor, or the like. In one implementation, processing device 1302 may include one or more processor cores. The processing device 1302 is configured to execute the processing logic 1326 for performing the operations discussed herein.

In one implementation, processing device 1302 can be part of a processor or an integrated circuit that includes the disclosed LLC caching architecture. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1318 communicably coupled to a network 1319. The computing system 1300 also may include a video display device 1310 (e.g., a liquid crystal display (LCD) or a cathode ray tube (CRT)), an alphanumeric input device 1312 (e.g., a keyboard), a cursor control device 1314 (e.g., a mouse), a signal generation device 1320 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1316 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a processor core comprising a 2) hardware register, the hardware register to store: a) a bit range for a number of address bits of physical memory addresses used for key identifiers (IDs); and b) a first key identifier (ID), of the key identifiers, to identify a boundary between non-restricted key IDs and restricted key IDs of the key identifiers; and 3) a memory controller coupled to the processor core, the memory controller to: a) determine, via access to the bit range and the first key ID in the hardware register, a key ID range of the restricted key IDs within the physical memory addresses; b) access a processor state comprising an indication that a first logical processor of the processor core executes in an untrusted domain mode; c) receive a memory transaction from the first logical processor, the memory transaction comprising an address associated with a second key ID; and d) generate a fault in response to a determination that the second key ID is within the key ID range of the restricted key IDs.

In Example 2, the processor of Example 1, wherein the fault is related to a type of access, to the second key ID, by the first logical processor.

In Example 3, the processor of Example 1, wherein the memory transaction includes a physical memory address to which is appended the second key ID, and wherein the memory controller is further to: a) determine the second key ID is within the key ID range of the restricted key IDs; and b) block access by the first logical processor to a memory location associated with the physical memory address.

In Example 4, the processor of Example 3, wherein the memory controller is further to, in response to generation of the fault: a) ignore further write transactions to the memory location from the first logical processor; and b) return all one values in response to further read transactions to the memory location.

In Example 5, the processor of Example 1, wherein the memory transaction includes a linear address, and wherein the memory controller is further to: a) translate, via paging, the linear address to a physical memory address; b) extract the second key ID from the physical memory address; and c) block access by the first logical processor to a memory location of the physical memory address.

In Example 6, the processor of Example 5, wherein the fault comprises a reserved key page fault associated with an attempt to set a reserved bit within a page table during the paging.

In Example 7, the processor of Example 1, wherein the memory transaction includes a guest virtual address, and wherein the first logical processor is further to: a0 translate, via a walk of guest page tables, the guest virtual address to a guest physical address; b) translate, via a walk of extended page tables (EPT), the guest physical address to a physical memory address; and c) extract the second key ID from the physical memory address; and d) wherein the memory controller is further to block access by the first logical processor to a memory location of the physical memory address.

In Example 8, the processor of Example 7, wherein the fault comprises a reserved key EPT misconfiguration fault associated with configuration of an EPT paging-structure entry reserved for future functionality.

In Example 9, the processor of Example 1, wherein the first logical processor executes a virtual machine monitor (VMM), and wherein the VMM issues the memory transaction.

Various implementations may have different combinations of the structural features described above. For instance, all optional features of the processors and methods described above may also be implemented with respect to a system described herein and specifics in the examples may be used anywhere in one or more implementations.

Example 10 is a system comprising: 1) a memory device; 2) a hardware register to store: a) a bit range for a number of address bits of physical memory addresses, of the memory device, used for key identifiers (IDs), the key identifiers associated with domain-specific encryption keys; and b) a first key identifier (ID), of the key identifiers, to identify a boundary between non-restricted key IDs and restricted key IDs of the key identifiers; and 3) a processor coupled to the memory device, the processor comprising a cryptographic engine, the hardware register, and 4) a memory controller, wherein the cryptographic engine is to: a) determine, via access to the bit range and the first key ID in the hardware register, a key ID range of the restricted key IDs within the physical memory addresses; b) receive a processor state comprising an indication that a first logical processor executes in an untrusted domain mode; c) receive, from the memory controller in response to a memory transaction from the first logical processor, a second key ID associated with an address of the memory transaction; and d) generate a fault in response to a determination that the second key ID is within the key ID range of the restricted key IDs.

In Example 11, the system of Example 10, wherein the state is received from a control register of the processor, and wherein the cryptographic engine further comprises: 1) a comparator to compare a value of the second key ID with the key ID range of the restricted key IDs; and 2) a first AND gate with a first input from the comparator and a second input from the control register.

In Example 12, the system of Example 11, wherein the memory transaction includes a physical memory address, associated with a memory location, to which is appended the second key ID, and wherein in response to the fault that is output from the first AND gate, the cryptographic engine is further to cause the memory controller to: a) ignore further write transactions to the memory location from the first logical processor; and b) return all one values in response to further read transactions to the memory location.

In Example 13, the system of Example 11, wherein the memory transaction includes a linear address mapped to a physical memory address to which is appended the second key ID, and wherein the cryptographic engine further comprises a second AND gate comprising: 1) inputs from the first AND gate and an indication from the memory controller that the physical memory address was determined from paging; and 2) an output comprising a reserved key page fault associated with an attempt to set a reserved bit within a page table during paging.

In Example 14, the system of Example 13, wherein the hardware register is a model-specific register, and wherein the cryptographic engine is further to direct the memory controller to block access by the first logical processor to a memory location of the physical memory address.

In Example 15, the system of Example 11, wherein the memory transaction includes a guest virtual address mapped to a physical memory address to which is appended the second key ID, and wherein the cryptographic engine further comprises a second AND gate comprising: 1) inputs from the first AND gate and an indication from a virtual machine monitor (VMM) that the physical memory address was determined from a walk of extended page tables (EPTs); and 2) an output comprising a reserved key EPT misconfiguration fault associated with configuration of an EPT paging-structure entry reserved for future functionality.

In Example 16, the system of Example 15, wherein the cryptographic engine is further to direct the memory controller to block access by the first logical processor to a memory location of the physical memory address.

Various implementations may have different combinations of the structural features described above. For instance, all optional features of the processors and methods described above may also be implemented with respect to a system described herein and specifics in the examples may be used anywhere in one or more implementations.

Example 17 is a method comprising: 1) retrieving, from a hardware register of a processor, a bit range for a number of address bits of physical memory addresses used for key identifiers (IDs); 2) retrieving, from the hardware register, a first key identifier (ID), of the key identifiers, to identify a boundary between non-restricted key IDs and restricted key IDs of the key identifiers; 3) determining, by a memory controller of the processor, a key ID range of the restricted key IDs within the physical memory addresses based on the bit range and the first key ID; 4) accessing, by the processor, a processor state comprising an indication that a first logical processor is executing in an untrusted domain mode; 5) intercepting, by the memory controller, a memory transaction from the first logical processor, the memory transaction comprising an address associated with a second key ID; and 6) generating, by the processor, a fault in response to a determination that the second key ID is within the key ID range of the restricted key IDs.

In Example 18, the method of Example 17, wherein the memory transaction includes a physical memory address to which is appended the second key ID, the method further comprising: 1) determining the second key ID is within the key ID range of the restricted key IDs; and 2) blocking access by the first logical processor to a memory location associated with the physical memory address.

In Example 19, the method of Example 18, further comprising, in response to generating the fault: 1) ignoring further write transactions to the memory location from the first logical processor; and 2) returning all one values in response to further read transactions to the memory location.

In Example 20, the method of Example 17, wherein the memory transaction includes a linear address, the method further comprising: 1) translating, via paging, the linear address to a physical memory address; 2) extracting the second key ID from the physical memory address; and 3) blocking access by the first logical processor to a memory location of the physical memory address.

In Example 21, the method of Example 20, wherein the fault comprises a reserved key page fault associated with an attempt to set a reserved bit within a page table during the paging.

In Example 22, the method of Example 17, wherein the memory transaction includes a guest virtual address, the method further comprising: 1) translating, via walking guest page tables, the guest virtual address to a guest physical address; 2) translating, via walking extended page tables (EPT), the guest physical address to a physical memory address; 3) extracting the second key ID appended to the physical memory address; and 4) blocking access by the first logical processor to a memory location of the physical memory address.

In Example 23, the method of Example 22, wherein the fault comprises a reserved key EPT misconfiguration fault associated with configuration of an EPT paging-structure entry reserved for future functionality.

Various implementations may have different combinations of the structural features described above. For instance, all optional features of the processors and methods described above may also be implemented with respect to a system described herein and specifics in the examples may be used anywhere in one or more implementations.

Example 24 is a non-transitory computer-readable medium storing instructions, which when executed by a processor having a core coupled to a system memory, cause the processor to execute a plurality of logic operations comprising: 1) retrieving, from a hardware register of a processor, a bit range for a number of address bits of physical memory addresses used for key identifiers (IDs); 2) retrieving, from the hardware register, a first key identifier (ID), of the key identifiers, to identify a boundary between non-restricted key IDs and restricted key IDs of the key identifiers; 3) determining, by a memory controller of the processor, a key ID range of the restricted key IDs within the physical memory addresses based on the bit range and the first key ID; 4) accessing, by the processor, a processor state comprising an indication that a first logical processor is executing in an untrusted domain mode; 5) intercepting, by the memory controller, a memory transaction from the first logical processor, the memory transaction comprising an address associated with a second key ID; and 6) generating, by the processor, a fault in response to a determination that the second key ID is within the key ID range of the restricted key IDs.

In Example 25, the non-transitory computer-readable medium of Example 24, wherein the memory transaction includes a physical memory address to which is appended the second key ID, the operations further comprising: 1) determining the second key ID is within the key ID range of the restricted key IDs; and 2) blocking access by the first logical processor to a memory location associated with the physical memory address.

In Example 26, the non-transitory computer-readable medium of Example 25, wherein the operations further comprise, in response to generating the fault: 1) ignoring further write transactions to the memory location from the first logical processor; and 2) returning all one values in response to further read transactions to the memory location.

In Example 27, the non-transitory computer-readable medium of Example 24, wherein the memory transaction includes a linear address, wherein the operations further comprise: 1) translating, via paging, the linear address to a physical memory address; 2) extracting the second key ID from the physical memory address; and 3) blocking access by the first logical processor to a memory location of the physical memory address.

In Example 28, the non-transitory computer-readable medium of Example 27, wherein the fault comprises a reserved key page fault associated with an attempt to set a reserved bit within a page table during the paging.

In Example 29, the non-transitory computer-readable medium of Example 24, wherein the memory transaction includes a guest virtual address, wherein the operations further comprise: 1) translating, via walking guest page tables, the guest virtual address to a guest physical address; 2) translating, via walking extended page tables (EPT), the guest physical address to a physical memory address; 3) extracting the second key ID appended to the physical memory address; and 4) blocking access by the first logical processor to a memory location of the physical memory address.

In Example 30, the non-transitory computer-readable medium of Example 29, wherein the fault comprises a reserved key EPT misconfiguration fault associated with configuration of an EPT paging-structure entry reserved for future functionality.

Various implementations may have different combinations of the structural features described above. For instance, all optional features of the processors and methods described above may also be implemented with respect to a system described herein and specifics in the examples may be used anywhere in one or more implementations.

Example 31 is a system comprising: 1) means for retrieving, from a hardware register of a processor, a bit range for a number of address bits of physical memory addresses used for key identifiers (IDs); 2) means for retrieving, from the hardware register, a first key identifier (ID), of the key identifiers, to identify a boundary between non-restricted key IDs and restricted key IDs of the key identifiers; 3) means for determining a key ID range of the restricted key IDs within the physical memory addresses based on the bit range and the first key ID; 4) means for accessing a processor state comprising an indication that a first logical processor is executing in an untrusted domain mode; 5) means for intercepting a memory transaction from the first logical processor, the memory transaction comprising an address associated with a second key ID; and 6) means for generating, by the processor, a fault in response to a determination that the second key ID is within the key ID range of the restricted key IDs.

In Example 32, the system of Example 31, wherein the memory transaction includes a physical memory address to which is appended the second key ID, further comprising: 1) means for determining the second key ID is within the key ID range of the restricted key IDs; and 2) means for blocking access by the first logical processor to a memory location associated with the physical memory address.

In Example 33, the system of Example 32, further comprising, in response to generating the fault: 1) means for ignoring further write transactions to the memory location from the first logical processor; and 2) means for returning all one values in response to further read transactions to the memory location.

In Example 34, the system of Example 31, wherein the memory transaction includes a linear address, the system further comprising: 1) for translating, via paging, the linear address to a physical memory address; 2) means for extracting the second key ID from the physical memory address; and 3) blocking access by the first logical processor to a memory location of the physical memory address.

In Example 35, the system of Example 34, wherein the fault comprises a reserved key page fault associated with an attempt to set a reserved bit within a page table during the paging.

In Example 36, the system of Example 31, wherein the memory transaction includes a guest virtual address, the system further comprising: 1) means for translating, via walking guest page tables, the guest virtual address to a guest physical address; 2) means for translating, via walking extended page tables (EPT), the guest physical address to a physical memory address; 3) means for extracting the second key ID appended to the physical memory address; and 4) means for blocking access by the first logical processor to a memory location of the physical memory address.

In Example 37, the system of Example 36, wherein the fault comprises a reserved key EPT misconfiguration fault associated with configuration of an EPT paging-structure entry reserved for future functionality.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processor core comprising one or more hardware registers, the one or more hardware registers to store:
      an indication of a number of bits of physical memory addresses used for key identifiers (IDs); and
      a boundary between non-restricted key IDs and restricted key IDs; and
   a memory controller coupled to the processor core, the memory controller to:
      determine a key ID range of the restricted key IDs within the physical memory addresses;
      access a processor state comprising an indication that a first logical processor of the processor core executes in an untrusted domain mode;
      receive a memory transaction from the first logical processor, the memory transaction comprising an address associated with a key ID; and
      generate a fault in response to a determination that the key ID is within the key ID range of the restricted key IDs.

2. The processor of claim 1, wherein the fault is related to a type of access, to the key ID, by the first logical processor.

3. The processor of claim 1, wherein the memory transaction includes a physical memory address to which is appended the key ID, and wherein the memory controller is further to:
   determine the key ID is within the key ID range of the restricted key IDs; and
   block access by the first logical processor to a memory location associated with the physical memory address.

4. The processor of claim 3, wherein the memory controller is further to, in response to generation of the fault:
   ignore further write transactions to the memory location from the first logical processor; and
   return all one values in response to further read transactions to the memory location.

5. The processor of claim 1, wherein the memory transaction includes a linear address, and wherein the memory controller is further to:
   translate, via paging, the linear address to a physical memory address;

extract the key ID from the physical memory address; and block access by the first logical processor to a memory location of the physical memory address.

6. The processor of claim 5, wherein the fault comprises a reserved key page fault associated with an attempt to set a reserved bit within a page table during the paging.

7. The processor of claim 1, wherein the memory transaction includes a guest virtual address, and wherein the first logical processor is further to:

translate, via a walk of guest page tables, the guest virtual address to a guest physical address;

translate, via a walk of extended page tables (EPT), the guest physical address to a physical memory address; and extract the key ID from the physical memory address; and wherein the memory controller is further to block access by the first logical processor to a memory location of the physical memory address.

8. The processor of claim 7, wherein the fault comprises a reserved key EPT misconfiguration fault associated with configuration of an EPT paging-structure entry reserved for future functionality.

9. The processor of claim 1, wherein the first logical processor executes a virtual machine monitor (VMM), and wherein the VMM issues the memory transaction.

10. A system comprising:

a memory device;

one or more hardware registers to store:

an indication of a number of address bits of physical memory addresses, of the memory device, to be used for key identifiers (IDs), the key identifiers associated with domain-specific encryption keys; and a boundary between non-restricted key IDs and restricted key IDs of the key identifiers; and a processor coupled to the memory device, the processor comprising a cryptographic engine, a hardware register of the one or more hardware registers, and a memory controller, wherein the cryptographic engine is to:

determine a key ID range of the restricted key IDs within the physical memory addresses;

receive a processor state comprising an indication that a first logical processor executes in an untrusted domain mode;

receive, from the memory controller in response to a memory transaction from the first logical processor, a key ID associated with an address of the memory transaction; and generate a fault in response to a determination that the key ID is within the key ID range of the restricted key IDs.

11. The system of claim 10, wherein the processor state is received from a control register of the processor, and wherein the cryptographic engine further comprises:

a comparator to compare a value of the key ID with the key ID range of the restricted key IDs; and a first AND gate with a first input from the comparator and a second input from the control register.

12. The system of claim 11, wherein the memory transaction includes a physical memory address, associated with a memory location, to which is appended the key ID, and wherein in response to the fault that is output from the first AND gate, the cryptographic engine is further to cause the memory controller to:

ignore further write transactions to the memory location from the first logical processor; and return all one values in response to further read transactions to the memory location.

13. The system of claim 11, wherein the memory transaction includes a linear address mapped to a physical memory address to which is appended the key ID, and wherein the cryptographic engine further comprises a second AND gate comprising:

inputs from the first AND gate and an indication from the memory controller that the physical memory address was determined from paging; and an output comprising a reserved key page fault associated with an attempt to set a reserved bit within a page table during paging.

14. The system of claim 13, wherein the hardware register is a model-specific register, and wherein the cryptographic engine is further to direct the memory controller to block access by the first logical processor to a memory location of the physical memory address.

15. The system of claim 11, wherein the memory transaction includes a guest virtual address mapped to a physical memory address to which is appended the key ID, and wherein the cryptographic engine further comprises a second AND gate comprising:

inputs from the first AND gate and an indication from a virtual machine monitor (VMM) that the physical memory address was determined from a walk of extended page tables (EPTs); and an output comprising a reserved key EPT misconfiguration fault associated with configuration of an EPT paging-structure entry reserved for future functionality.

16. The system of claim 15, wherein the cryptographic engine is further to direct the memory controller to block access by the first logical processor to a memory location of the physical memory address.

17. A method comprising:

retrieving a number of address bits of physical memory addresses used for key identifiers (IDs);

retrieving a first key identifier (ID), of the key identifiers, to identify a boundary between non-restricted key IDs and restricted key IDs of the key identifiers;

determining, by a memory controller of a processor, a key ID range of the restricted key IDs within the physical memory addresses;

accessing, by the processor, a processor state comprising an indication that a first logical processor is executing in an untrusted domain mode;

intercepting, by the memory controller, a memory transaction from the first logical processor, the memory transaction comprising an address associated with a key ID; and generating, by the processor, a fault in response to a determination that the key ID is within the key ID range of the restricted key IDs.

18. The method of claim 17, wherein the memory transaction includes a physical memory address to which is appended the key ID, the method further comprising:

determining the key ID is within the key ID range of the restricted key IDs; and blocking access by the first logical processor to a memory location associated with the physical memory address.

19. The method of claim 18, further comprising, in response to generating the fault:

ignoring further write transactions to the memory location from the first logical processor; and returning all one values in response to further read transactions to the memory location.

20. The method of claim 17, wherein the memory transaction includes a linear address, the method further comprising:

translating, via paging, the linear address to a physical memory address;

extracting the key ID from the physical memory address; and blocking access by the first logical processor to a memory location of the physical memory address.

21. The method of claim 20, wherein the fault comprises a reserved key page fault associated with an attempt to set a reserved bit within a page table during the paging.

22. The method of claim 17, wherein the memory transaction includes a guest virtual address, the method further comprising:

translating, via walking guest page tables, the guest virtual address to a guest physical address;

translating, via walking extended page tables (EPT), the guest physical address to a physical memory address;

extracting the key ID appended to the physical memory address; and blocking access by the first logical processor to a memory location of the physical memory address.

23. The method of claim 22, wherein the fault comprises a reserved key EPT misconfiguration fault associated with configuration of an EPT paging-structure entry reserved for future functionality.

\* \* \* \* \*